United States Patent [19]

Sugahara et al.

[11] 4,102,977

[45] Jul. 25, 1978

[54] PROCESS FOR THE PREPARATION OF ALKALI ALUMINOSILICATE DETERGENT BUILDER

[75] Inventors: Yujiro Sugahara, Tokyo; Koichi Usui, Shibata; Masahide Ogawa, Nakajo; Hideaki Kurosaki, Shibata; Shigehisa Imafuku, Nakajo, all of Japan

[73] Assignee: Mizusawa Kagaku Kogyo Kabushiki Kaisha, Osaka, Japan

[21] Appl. No.: 741,365

[22] Filed: Nov. 12, 1976

[30] Foreign Application Priority Data

Nov. 18, 1975 [JP] Japan .............................. 50-137814
Nov. 27, 1975 [JP] Japan .............................. 50-141141
Oct. 13, 1976 [JP] Japan .............................. 51-121795

[51] Int. Cl.² .......................... C01B 33/28; C11D 9/18
[52] U.S. Cl. .................................. 423/118; 252/89 R; 252/131; 423/328; 423/329
[58] Field of Search .................. 423/118, 328, 329; 252/455 Z, 89, 131, 179

[56] References Cited

U.S. PATENT DOCUMENTS

| | | | |
|---|---|---|---|
| 3,185,544 | 5/1965 | Maher | 423/118 |
| 3,390,958 | 7/1968 | Howell | 423/118 |
| 3,393,045 | 7/1968 | Maher | 423/118 |
| 3,985,669 | 10/1976 | Krummel et al. | 252/89 R |
| 4,041,135 | 9/1977 | Williams et al. | 423/328 X |

FOREIGN PATENT DOCUMENTS

| | | | |
|---|---|---|---|
| 2,433,485 | 2/1975 | Fed. Rep. of Germany | 423/328 |
| 1,007,853 | 10/1965 | United Kingdom | 423/118 |
| 1,062,064 | 3/1967 | United Kingdom | 423/118 |

OTHER PUBLICATIONS

Sotirova et al., "Chemical Abstracts," vol. 77, 1972, 77363t.

*Primary Examiner*—Edward J. Meros
*Attorney, Agent, or Firm*—Sherman & Shalloway

[57] ABSTRACT

A detergent builder consisting essentially of an inorganic fine powder composed mainly of an alkali metal aluminosilicate having an X-ray diffraction pattern substantially the same as that of zeolite of the type A and having a degree of crystallization in the range of from 35 to 75%, wherein the inorganic fine powder has a primary particle size smaller than 1 $\mu$ and a secondary particle size smaller than 4 $\mu$, the inorganic fine powder has a buffer capacity (S) of at least 132 ml/100 g of solids, the buffer capacity being expressed by an amount of hydrochloric acid necessary for lowering the pH of a 1% aqueous dispersion of said inorganic fine powder from 9.0 to 6.75 when the dispersion is titrated with 0.4N hydrochloric acid at a rate of 20 to 50 ml/hr, and wherein the inorganic fine powder has a calcium ion binding property (C. I.) of at least 70 mg/g as expressed as CaO.

22 Claims, 11 Drawing Figures

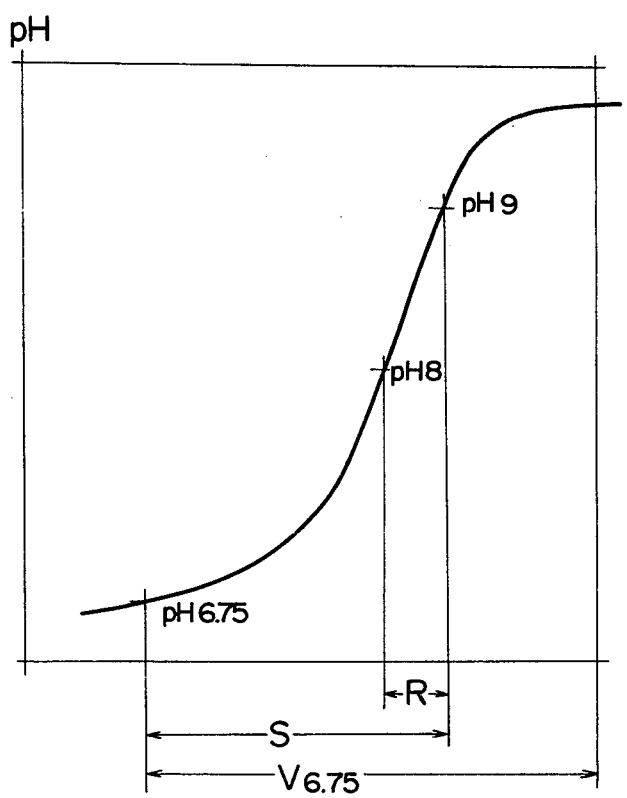
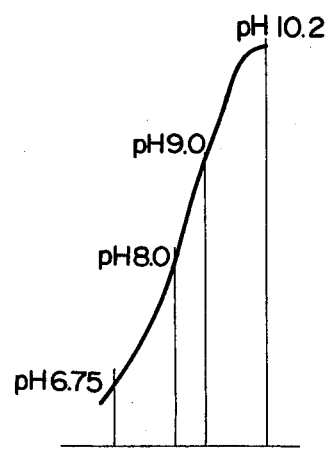
Fig. 2
Fig. 3
AMOUNT TITRATED OF HYDROCHLORIC ACID (mL/100g SOLID)

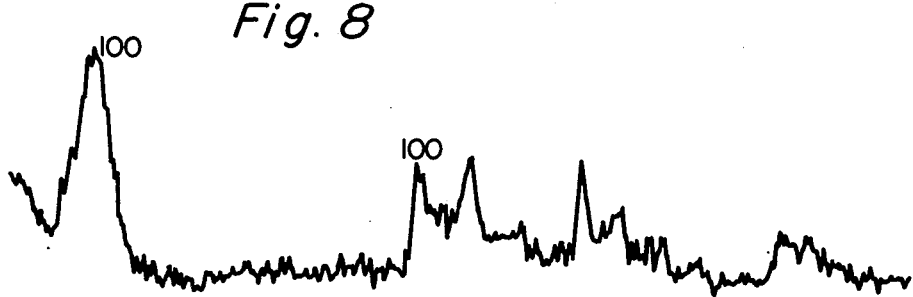
Fig. 8
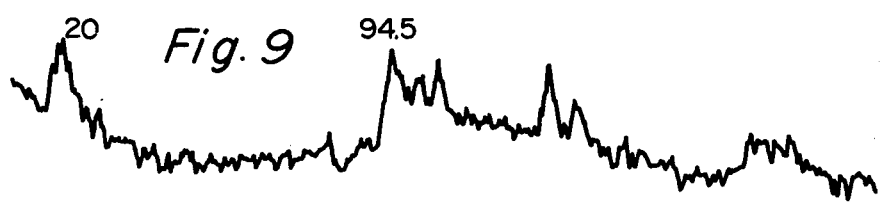
Fig. 9
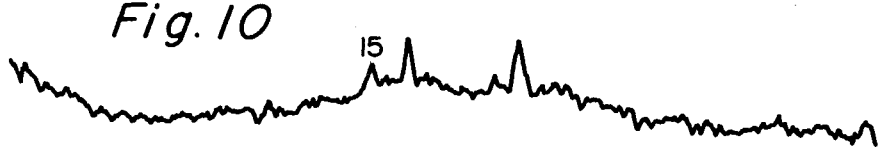
Fig. 10
Fig. 11
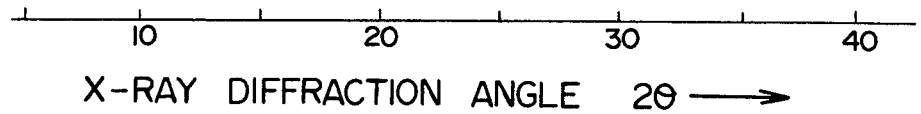
X-RAY DIFFRACTION ANGLE 2θ ⟶

PROCESS FOR THE PREPARATION OF ALKALI ALUMINOSILICATE DETERGENT BUILDER

This invention relates to a detergent builder composed of a finely divided zeolite, which has novel characteristics, and to a process for the preparation of this novel detergent builder. More particularly, the invention relates to a novel finely divided alkali metal aluminosilicate builder having in combination an excellent alkali buffer capacity at the washing step, an excellent metal ion sequestrating property, an excellent re-contamination preventing property, a good dispersibility in a washing liquid and a good rinsing property, and to a novel process for producing this builder in a high yield at a high productivity from a smectite clay mineral such as montmorillonite clay.

An alkali metal aluminosilicate such as zeolite has an excellent hard water-softening property, namely a high calcium ion exchange capacity, and it has been long known that because of this specific property alkali metal aluminosilicates can be used as detergent builders.

For example, the specification of Japanese Patent No. 188,551 (Japanese Patent Publication No. 1119/51) proposed by us in the past discloses a process comprising treating drastically acid clay or a similar clay with a mineral acid to dissolve out and remove all or substantially all components other than silica and reacting the resulting activated silica with an alkali metal aluminate to form an alkali metal polysilicate and a water-insoluble solid alkali metal aluminosilicate corresponding to zeolite.

The above specification also teaches that when the so prepared sodium aluminosilicate is incorporated into a soap, a detergent or the like, it softens hard water and provides excellent emulsifiability, high permeability, good bubbling property, good rinsing property, improved touch and high washing powder. It also is taught that this sodium aluminosilicate has good compatibility and affinity with soaps and the like.

The invention disclosed in the above patent specification is significant in the point that it reveals that a synthetic alkali metal aluminosilicate is valuable as a detergent builder. However, the specification does not specifically disclose conditions under which an alkali metal aluminosilicate builder having an optimum combination of various washing-promoting properties will be obtained.

It is said that what are important among washing-promoting properties of builders are a metal ion sequestrating property and a buffer capacity. Polyvalent metal ions contained in service water and stains, such as ions of calcium, magnesium and iron, react with surface active agents to form hardly water-soluble salts, resulting in drastic reduction of the surface activating capacity of detergents. Accordingly, it is important that detergent builders should have a property of sequestrating ions of polyvalent metals such as calcium, namely an ion exchange property. Greasy grimes, which must be taken into consideration at washing of fibers, are composed mainly of fatty acids, triglycerides and waxes. These oil stains have a tendency to reduce the pH of a washing liquid. In order to remove stains, it is important that the pH of the washing liquid should be on the alkaline side, and when the pH of the washing liquid is reduced, it becomes difficult to remove stains for interfacial electrical reasons. In view of the foregoing, it generally is required that a substance having a buffer capacity under alkaline conditions should be used as a detergent builder.

Another property required of a detergent builder is that stains extracted in the washing liquid are absorbed and fixed so as not to cause re-dissolution of the stains and so as to prevent re-contamination of washed fibrous articles with the removed stains. In short, it is desirable for a detergent builder to have a re-contamination preventing property.

Since an alkali aluminosilicate builder is water-insoluble, it is important that the builder should be excellent in the dispersibility in a washing liquid and the rinsing property. All the actions of a water-insoluble solid builder are performed through the contact interface between the builder and the washing liquid. Accordingly, as the solid builder is uniformly and homogeneously dispersed in the washing liquid and as the surface area per unit weight is large, the above-mentioned characteristics such as the metal ion sequestrating property, buffer capacity and re-contamination preventing property are manifested more conspicuously. When the dispersibility of a water-insoluble solid builder is insufficient, the solid builder tends to adhere to washed articles and to reduce the rinsing property, and such troubles as so-called "powder falling" which is a phenomenon that builder powder falls from a dried washed article are often caused.

When a solid builder is composed of coarse particles, sedimentation or deposition of builder particles takes place in pipes for discharging washing liquids and such troubles as clogging of tubes and wearing of tube walls are caused.

In view of the foregoing, it is preferred that an alkali aluminosilicate builder be composed of particles as fine as possible. However, an industrial process capable of providing fine particles of an alkali aluminosilicate has not been developed in the art. For example, Japanese Patent Application Laid-Open Specification No. 12381/75 discloses that an aluminosilicate compound in which at least 80% by weight of particles have a size of 10 to 0.01 $\mu$, preferably 8 to 0.1 $\mu$, can be used as a builder, and Japanese Patent Application Laid-Open Specification No. 53404/75 discloses that an inorganic aluminosilicate ion exchange material having a particle size of about 0.1 to about 100 $\mu$, especially 0.2 to 10 $\mu$, can be used as a builder. However, in a specific embodiment of the former laid-open specification, only an alkali aluminosilicate in which most of particles have a primary particle size of 1 to 3 $\mu$ is obtained, and in a specific embodiment of the latter laid-open specification, only an alkali aluminosilicate composed of particles having an average primary particle size of 3 to 5 $\mu$ is obtained. Namely, it is apparent that though it is desirable to use an alkali metal aluminosilicate builder having a smaller particle size, it has been very difficult for experts in the art to synthesize an alkali metal aluminosilicate having a primary particle size smaller than 1 $\mu$.

This invention relates to an improvement in the alkali metals aluminosilicate builder disclosed in the above-mentioned Japanese Pat. No. 188,551. More specifically, this invention provides a detergent builder composed of a zeolite in which substantially all of the particles have a primary particle size smaller than 1 $\mu$, which has in combination a high alkali buffer capacity, an excellent metal ion sequestrating property, a high re-contamination preventing property and a good dispersibility into a washing liquid, and the invention further provides a process for preparing this excellent detergent builder.

We found that in the process for preparing a zeolite builder from activated silica or activated aluminosilicic acid obtained by the acid treatment of a smectite clay, when the activated silica or activated alumina-silica is subjected to the pre-treatment with a caustic alkali or water-soluble alkali metal silicate and an alkali metal polysilicate or alkali metal polyaluminosilicate having a specific composition is prepared prior to the synthesis of zeolite, a finely divided zeolite in which substantially all of the particles have a primary particle size smaller than 1 μ can be obtained and this finely divided zeolite is superior or at least comparable to known zeolites with respect to the metal ion sequestrating property and is conspicuously excellent in such properties as buffer capacity, re-contamination preventing property and dispersibility in a washing liquid. Based on this finding, we have now completed this invention.

More specifically, in accordance with this invention, there is provided a detergent builder consisting essentially of an inorganic fine powder composed mainly of an alkali aluminosilicate having an X-ray diffraction pattern substantially the same as that of zeolite of the type A and having a degree of crystallization in the range of from 35 to 75%, wherein said inorganic fine powder has a primary particle size smaller than 1 μ and a second particle size smaller than 4 μ, said inorganic fine powder has a buffer capacity (S) of at least 132 ml/100 g of solids, said buffer capacity being expressed by an amount of hydrochloric acid required for lowering the pH of a 1% aqueous dispersion of said inorganic fine powder from 9.0 to 6.75 when said dispersion is titrated with 0.4N hydrochloric acid solution at a rate of 20 to 50 ml/hr, and wherein said inorganic fine powder has a calcium ion binding property (C.I.) of at least 70 mg/g as expressed as CaO.

In accordance with this invention, there also is provided a process for the preparation of detergent builders which comprises acid-treating a smectite clay mineral under such conditions that at least the X-ray diffraction peak of the plane index [001] substantially disappears, to thereby prepare activated silicic acid or activated aluminosilicic acid, treating the so prepared activated silicic acid or activated aluminosilicic acid with an alkali metal hydroxide or a water-soluble alkali metal silicate to prepare an alkali metal polysilicate or alkali metal polyaluminosilicate having a composition in which the $Na_2O/SiO_2$ molar ratio is in the range of from 1/3.5 to 1/500, mixing said alkali metal polysilicate or alkali metal polyaluminosilicate with additional amounts of alumina and alkali metal components and water to prepare a homogeneous mixture having a composition capable of forming zeolite of the type A, and heating said homogeneous mixture to crystallize out fine zeolitic particles having a primary particle size smaller than 1 μ.

This invention will now be described in detail by the following description and the accompanying drawings in which:

FIG. 2 illustrates a titration curve for alkali metal aluminosilicate with hydrochloric acid;

FIG. 3 illustrates a hydrochloric acid titration curve of commercially available zeolite of type 4A;

FIG. 8 illustrates an X-ray diffraction pattern of acid clay raw material;

FIG. 9 illustrates an X-ray diffraction pattern of aluminasilicate according to Example 5;

FIG. 10 illustrates an X-ray diffraction pattern of alumina-silica obtained in Example 5; and FIG. 11 illustrates an X-ray diffraction pattern of another alumina-silica obtained in Example 5.

CHEMICAL STRUCTURE OF ALKALI METAL ALUMINOSILICATE BUILDER

Figure 1:
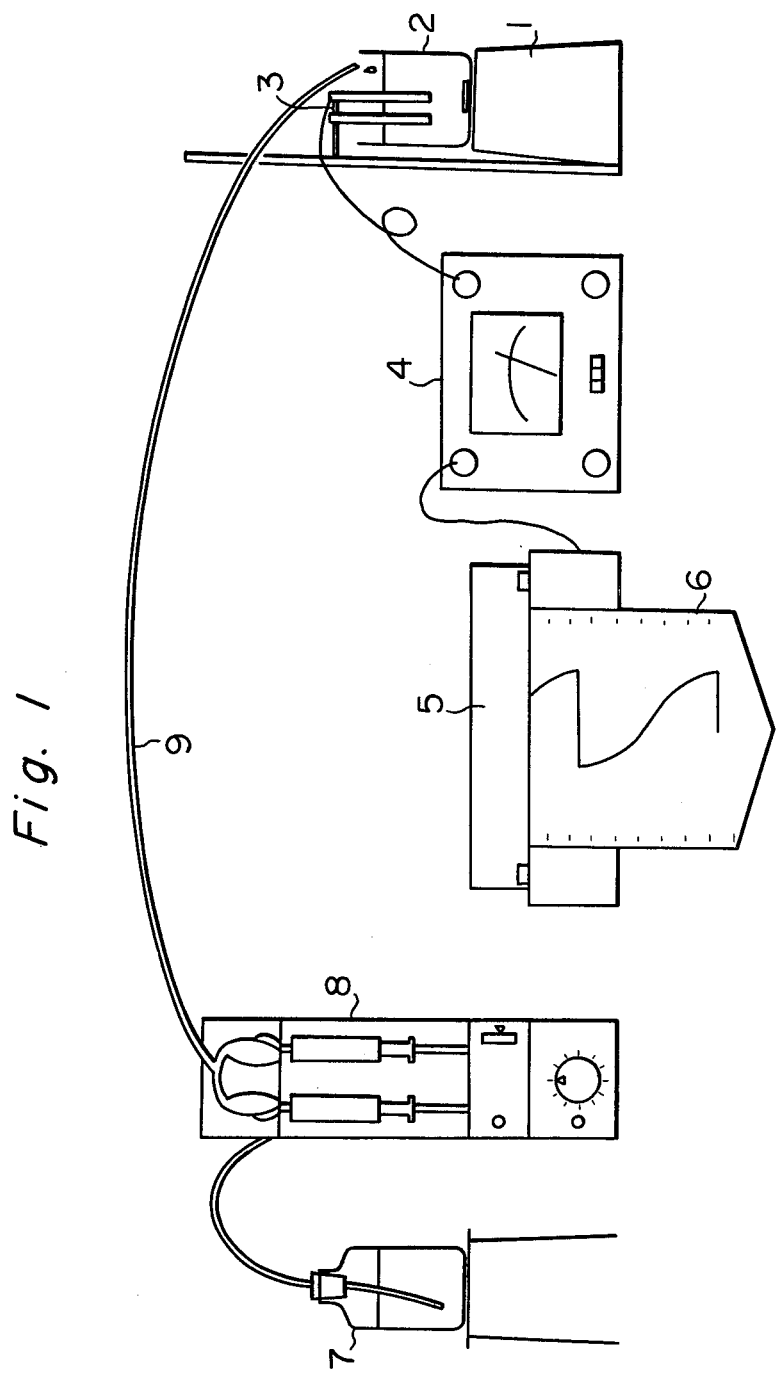
FIG. 1 illustrates the arrangement of apparatus measuring buffer capacity.

In general, the alkali metal aluminosilicate builder of this invention has a chemical composition (% by weight) shown in Table A given below.

Table A

| | Chemical Composition (% by weight) (as determined with sample dried at 110° C.) | |
|---|---|---|
| | Ordinary Range | Preferred Range |
| $SiO_2$ | 35 – 45 | 36 – 40 |
| $Al_2O_3$ | 25 – 35 | 27 – 33 |
| $Na_2O$ | 13 – 20 | 14 – 19 |
| ignition loss | 14 – 18 | 15 – 17 |
| $Fe_2O_3$ | below 3 | below 1 |
| CaO | below 3 | below 0.1 |
| MgO | below 3 | below 0.1 |

This alkali metal aluminosilicate builder is composed mainly of a water-insoluble crystalline sodium aluminosilicate represented ideally by the following formula:

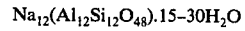

$$Na_{12}(Al_{12}Si_{12}O_{48}).15\text{-}30H_2O$$

and it contains minute amounts of an amorphous alkali metal polysilicate, aluminum polysilicate or alkali metal aluminosilicate and crystalline polysilicic acid materials as impurities within such a range as will satisfy the requirement of the degree of crystillization described hereinafter.

STRUCTURE AND PROPERTIES OF ALKALI ALUMINOSILICATE BUILDER

The water-insoluble inorganic powdery builder of this invention has an X-ray diffraction pattern indicated in Table B given hereinafter. Namely, it has an X-ray diffraction pattern substantially the same as that of zeolite of the type A. The X-ray diffraction pattern referred to in the instant specification and claims means one determined by the following X-ray diffraction method using Cu-Kα rays.

(i) Method for determination of X-ray diffraction pattern:

An X-ray diffraction apparatus manufactured by Rigaku Denki K. K. (X-ray generator Model Cat. No. 2171L and goniometer Model Cat. No. 4001) is used for the determination. Conditions adopted are as follows:

Target: Cu
Filter: Ni
Voltage: 30 KV
Current: 15 mA

Count Full Scale: 500 C/S
High Voltage: 1200 V
Time Constant: 2 seconds
Chart Speed: 2 cm/min
Scanning Speed: 2°/min
Divergency: 1°
Receiving Slit Width: 0.3 mm Each sample is first dried in a drier maintained at 110° C. and pulverized in an agate mortar, and it is then used for the measurement.

Table B

| X-Ray Diffraction Pattern | |
|---|---|
| Spacing d (KX) | Relative Intensity (I/I$_o$) |
| 12.440 | 65.3 |
| 8.750 | 58.5 |
| 7.132 | 48.3 |
| 5.534 | 41.6 |
| 4.371 | 17.8 |
| 4.111 | 60 |
| 3.720 | 95.8 |
| 3.421 | 33 |
| 3.300 | 81.4 |
| 2.986 | 100 |
| 2.910 | 24.6 |
| 2.753 | 27.2 |
| 2.627 | 70.4 |
| 2.513 | 13.6 |
| 2.466 | 11.0 |

In the instant specification and claims, by the term "X-ray diffraction pattern substantially the same as the above X-ray diffraction pattern" is meant an X-ray diffraction pattern in which the relative intensity of each diffraction peak can be changed from the above-indicated value within a certain range, generally within ± 30%, especially within ± 20%.

In the alkali metal aluminosilicate builder of this invention, the order of the intensity is sometimes changed depending on the kind of the solid polysilicate used for the synthesis. For example, when a highly acid-treated clay mineral is used as the starting solid polysilicate, the intensity of the peak of the spacing d of 12.440 KX is higher than the intensity of the peak of the spacing d of 8.750 KX, but it is found that this order is reversed when a lowly acid-treated clay mineral is used. Further, when a small amount of a sodalite hydrate crystal structure is present in the alkali metal aluminosilicate builder, the order of the intensity between the peak of the spacing d of 2.986 Kx and the peak of the spacing d of 3.720 KX is reversed.

Since the alkali aluminosilicate builder of this invention is derived from a smectite clay mineral, it occasionally has, in addition to the above-mentioned X-ray diffraction peaks, those inherent of the starting clay mineral. It is often observed that the alkali aluminosilicate builder formed by using acid-treated acid clay shows small peaks inherent of substances contained in this starting raw clay, for example, quartz (d = 3.343 KX), cristobalite (d = 4.05 KX) and feldspar (d = 3.7697 and 3.1977 KX). When the akali aluminosilicate builder of this invention has a relatively low value of the degree of crystallization described hereinafter, it is characterized in that its X-ray diffraction pattern has small peaks such as mentioned above.

It is known that crystalline alkali aluminosilicates, especially zeolites, include various kinds differing in the chemical structure, for example, synthetic zeolites of types A, X, Y and T, chabazite, mordenite, erionite, faujasite, clinoptilolite and sodalite hydrate. The alkali aluminosilicate having the above-mentioned X-ray diffraction pattern, that is used in this invention, is one known as zeolite of the type A.

In the builder of this invention, in order to enhance the washing-promoting activity, it is important that an alkali aluminosilicate having a structure of the type A zeolite is especially chosen among various zeolites. It is said that important characteristics of the builder for promoting the washing are the metal ion sequestrating property and the buffer capacity. Ions of polyvalent metals contained in service water or stains, such as ions of calcium, magnesium and iron, react with a surface active agent in a detergent to form hardly water-soluble salts, and hence, they drastically reduce the surface activating property of the detergent. Accordingly, it is important that the detergent builder should have a property of sequestering ions of polyvalent metals such as calcium, namely an ion exchange property. Theoretical ion exchange capacities of various zeolites are as shown in Table C given hereinafter. From these data, it will readily be understood that an alkali metal aluminosilicate of the type A zeolite, which is especially chosen in this invention, is excellent in the metal ion sequestrating property.

Table C

| | Ion Exchange Capacity (milli-equivalent/g) | |
|---|---|---|
| Zeolite | Ion Exchange Capacity (based on anhydride) | Ion Exchange Capacity (based on hydrate) |
| chabazite | 5 | 3.9 |
| mordenite | 2.6 | 2.3 |
| erionite | 3.8 | 3.1 |
| clinoptilolite | 2.6 | 2.2 |
| zeolite A | 7.0 | 5.5 |
| zeolite X | 6.4 | 4.7 |
| zeolite Y | 5.0 | 3.7 |
| zeolite T | 3.4 | 2.8 |

Although the builder of this invention is synthesized from a naturally occurring smectite clay mineral as the raw material, it has a metal sequestrating property superior or at least comparable to that of a known synthetic zeolite prepared from a synthetic alkali silicate solution. The metal ion sequestrating property can be determined according to the following measurement method.

(ii) Method for determination of calcium ion binding property (C.I.):

A calcium-containing solution having a calcium concentration of 300 mg/l (D.H. 30) as CaO is prepared and 500 ml of the so prepared solution is taken into a beaker having a capacity of 1 liter and is heated at 30° C. Then, 0.500 g of a sample which has been dried for 2 hours in a drier maintained at 110° C. previously and naturally cooled to room temperature in a desiccator is precisely weighed by a constant sensibility direct-reading balance and poured into the calcium-containing solution. The mixture is agitated in a jar tester for 20 minutes at an agitation rate of 120 rpm to thereby cause the sample to perform exchange of calcium ion. Then, the mixture is filtered by a filter paper No. 6 and precisely measured 10 ml of the filtrate is collected and diluted with deionized water to form about 50 ml of a diluted solution. Then, 4 ml of 8N KOH is added to the solution to adjust the pH to 12, and several drops of 5% KCN are added and 0.1 g of NN indicator is further added. Then titration is carried out by using an EDTA solution having a concentration of 1/100 mole/l to determine the CaO concentration, and the calcium ion binding property is calculated according to the following equation:

Calcium ion binding property (mg/g) = 300 − 56BF
wherein B denotes the amount (ml) of the EDTA solution having a concentration of 1/100 mole/l which is used for titration and F represents the factor of the EDTA solution having a concentration of 1/100 mole/l.

The alkali aluminosilicate builder of this invention has generally a calcium binding property of at least 70 mg/g, preferably 90 to 160 mg/g, though the value is changed to some extent according to such factors as the kind of the starting raw clay mineral, the acid treatment conditions and the conditions for crystallizing out the zeolite. The theoretical value of the calcium binding property of zeolite A is 152 mg/g based on the hydrate. It is quite surprising that the builder of this invention has a calcium binding property value very close to this theoretical value even if the degree of crystallization described hereinafter is considerably low.

In view of the calcium binding property, it is important that the builder of this invention should have a degree of crystallization of at least 35%, especially at least 55%. Further, in view of the buffer capacity described hereinafter and the control of keeping the surface potential of particles negative after exchange of calcium ion, it is preferred that the degree of crystallization be not higher than 75%, especially not higher than 70%.

In the instant specification and claims, by the term "degree of crystallization" is meant a value determined according to the following method.

(iii) Method for determination of degree of crystallization (C.R.):

(a) The X-ray diffraction curve of a sample is determined according to the above-mentioned powder X-ray diffraction method.

(b) Points of diffraction angle $2\theta = 9°$ and $2\theta = 39°$ in the X-ray diffraction curve are connected by a straight line. This line is designated as the base line.

(c) Two lowermost points among troughs between every two adjacent peaks (except those in which the distance between two diffraction peak skirts is smaller than 1°) are connected by a straight line. This line is designated as the amorphous line.

(d) The degree (%) of crystallization is calculated according to the following formula:

$$\text{Degree (\%) of crystallization} = \frac{S_C}{S_A + S_C} \times 100$$

wherein $S_A$ represents an area between the base line and amorphous line and $S_C$ denotes an area between the amorphous line and the diffraction curve.

In the case where the X-ray diffraction pattern includes diffraction peaks of quartz, cristobalite, feldspar and the like and the degree of crystallization toward zeolite is relatively low, crystalline portions other than the zeolite portion are inclusively calculated and the obtained value of the degree of crystallization is a little higher than the actual value. This difference, however, causes no substantial problem when comparison is made based on such values.

Commercially available synthetic zeolite of the type A has a degree of crystallization higher than 75%, when determined according to the above-mentioned method. This known synthetic zeolite of the type A having a degree of crystallization higher than 75% is insufficient in the buffer capacity and other properties as is seen from sample H-1 shown in Comparative Example 1 given hereinafter.

Since the alkali builder of this invention is synthesized from a smectite clay mineral and has a degree of crystallization in the above-mentioned range, it can possess a buffer capacity (S) of at least 132 ml/100 g of solids, preferably at least 136 ml/100 g of solids, especially preferably at least 140 ml/100 g of solids. In the instant specification and claims, the buffer capacity (S) is defined as an amount (ml/100 g of solids) of hydrochloric acid necessary for lowering the pH of a 1% aqueous dispersion of a sample from 9.0 to 6.75 when the dispersion is titrated with 0.4N hydrochloric acid at a rate of 20 to 50 ml/hr. More specifically, this value is determined according to the following method.

(iv) Method for determination of buffer capacity (S) and initial buffer capacity (R):

Referring now to FIG. 1 illustrating the arrangement of an apparatus for measuring the buffer capacity, a 1% aqueous dispersion of a sample is charged in a vessel 2 equipped with a magnetic stirrer in an amount corresponding to 3 g of solids in the dispersion.

A glass electrode 3 is immersed in this dispersion and this electrode is connected to a pH meter 4. The output terminal of the pH meter 4 is connected to a recorder 5 and the detected pH value is recorded on a recording paper 6.

Separately, 0.4N solution of hydrochloric acid is charged in a vessel 7, and this hydrochloric acid is added dropwise to the aqueous dispersion in the vessel 2 at a constant rate through a metering pump 8 and a conduit 9.

The instruments and conditions used and adopted for the measurement are as follows:

pH meter: model HM-5A manufactured by Toa Denpa K. K.

Recorder: model QPD-53 53 manufactured by Hitachi Seisakusho K. K., full scale = 50 mV, chart speed = 240 mm/hr Constant flow pump: manufactured by Nisshin Kagaku K. K., hydrochloric acid pouring rate = 37 ml/hr A typical instance of the curve of titration of the alkali metal aluminosilicate with hydrochloric acid is shown in FIG. 2, in which the ordinate denotes the pH value and the abscissa denotes the amount titrated of hydrochloric acid (ml/100 g of solids). The following characteristics can be determined from this titration curve.

(a) Buffer capacity (S):

The buffer capacity (S) is expressed as the amount of hydrochloric acid required for lowering the pH from 9.0 to 6.75. Namely, the buffer capacity (S) is calculated according to the following formula:

$$S = V_{6.75} - V_9$$

wherein $V_9$ denotes the amount (ml/100 g of solids) of hydrochloric acid required for lowering the pH of the above-mentioned dispersion to 9.0 and $V_{6.75}$ denotes the amount (ml/100 g of solids) of hydrochloric acid required for lowering the pH of the above-mentioned dispersion to 6.75.

(b) Initial buffer capacity (R):

The initial buffer capacity (R) is expressed as the amount of hydrochloric acid required for lowering the pH from 9.0 to 8.0. Namely, the initial buffer capacity (R) is calculated according to the following formula:

$$R = V_8 - V_9$$

wherein $V_9$ is as defined above and $V_8$ denotes the amount (ml/100 g of solids) of hydrochloric acid required for lowering the pH of the above-mentioned dispersion to 8.0.

(c) Effective alkali quantity ($Q_c$):

The effective alkali quantity is expressed as the total amount of hydrochloric acid required for lowering the pH of the above-mentioned dispersion to 6.75. More specifically, the concentration ($Q_c$, %) of the effective alkali in the builder as NaOH can be calculated from the $V_{6.75}$ value according to the following formula:

$$Q_c = 1.60 \times 10^{-2} V_{6.75}$$

As is apparent from FIG. 2, at the initial stage of titration with hydrochloric acid, the pH of the aqueous dispersion is almost constant, and with advance of titration, the pH begins to decrease abruptly. The reason why the buffer capacity is defined as the amount of hydrochloric acid required for lowering the pH from 9.0 to 6.75 in this invention is as follows:

In order to attain a good washing effect, it is important that the zeta ($\zeta$) potential of fibers or stains in the washing liquid should be increased in the negative direction, and in order to control this zeta potential forcibly on the negative side, it is preferred that the pH of the washing liquid be maintained on the alkaline side, namely at a level higher than 6.75, irrespective of acidic substances contained in stains and the like.

When the builder per se has a pH value considerably higher than 9.0, fibers are readily damaged by the washing liquid. Accordingly, it is desirable for the builder to show a high resistance to lowering of the pH in the range of from a relatively lowly alkaline pH of 9.0 to the above-mentioned critical pH level of 6.75. In view of the foregoing, in this invention, the buffer capacity is defined as the amount of hydrochloric acid required for lowering the pH from 9.0 to 6.75. The higher the buffer capacity, the higher is the buffer action of the detergent builder, and an excellent washing-promoting action can be attained by a builder having a high buffer capacity. As will be apparent from the foregoing illustration, a detergent composition comprising a builder having a buffer capacity within the range specified in this invention is characterized in that reduction of the washing power is remarkably controlled and is advantageous in that larger quantities of articles can be washed with use of a much reduced amount of the detergent.

In order to effectively remove heavy stains from articles or materials to be washed, it is preferred that the above-mentioned initial buffer capacity (R) of the builder of this invention be at least 35 ml/100 g of solids, especially at least 40 ml/100 g of solids.

In the builder of the present invention, the abovementioned effective alkali quantity ($Q_c$) is ordinarily in the range of from 2 to 8%, especially 3 to 6%, though this effective alkali amount ($Q_c$) differs to some extent depending on the crystal structure or composition of the zeolite.

FIG. 3 illustrates a hydrochloric acid titration curve of commercially available zeolite of the type 4A (manufactured by Tekkosha K.K.), from which it will readily be understood that the known zeolite has an extremely low buffer capacity (S = 69.1).

Figure 4:
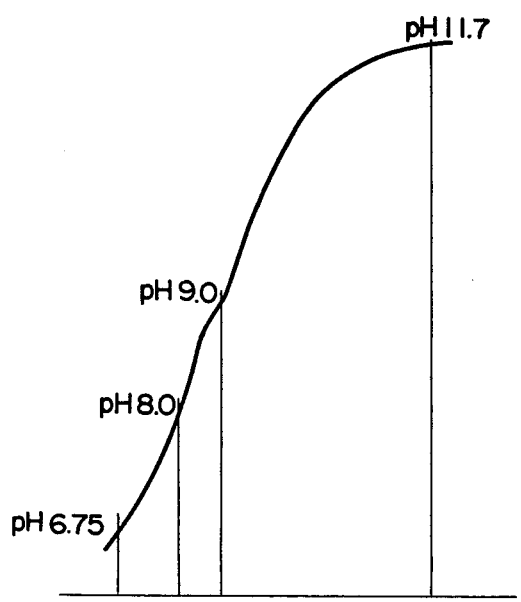
FIG. 4 illustrates a titration curve of a homogeneous mixture of commercially available zeolite and sodium hydroxide.

FIG. 4 illustrates a titration curve of a homogeneous mixture of the above-mentioned commercially available zeolite and sodium hydroxide. In this composition, the effective alkali quantity ($Q_c$) is much larger than in case of the zeolite shown in FIG. 3, but in case of this composition, it will readily be understood that the amount of the free alkali bringing about a pH higher than 9, namely the $V_9$ value, is extremely increased and the buffer capacity (S) is still at such a low level as 67 ml/100 g of solids.

Figure 5:
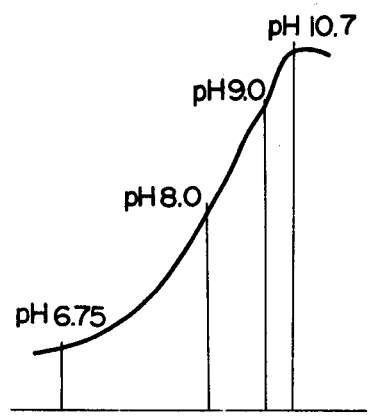
FIG. 5 illustrates a titration curve of the building of this invention obtained in Example 1.

In contrast, as will be apparent from FIG. 5 illustrating a titration curve of the builder of this invention obtained in Example 1 given hereinafter, since the builder is derived from a smectite clay mineral, it has such a high biffer capacity (S) as 150.4 ml/100 g of solids.

In alkali metal aluminosilicate builders, in general, it is construed that a part of the alkali metal component is present in the form of a crystalline alkali aluminosilicate, another part of the alkali component is present in the form of an alkali hydroxide or a water-soluble alkali metal salt and still another part of the alkali metal component is present in the alkalized state. As the term "hydrated state" indicates the state where dissolved or dispersed particles are combined with molecules of water or dissolved or dispersed particles and molecules of water have mutual actions with each other, in the instant specification the term "alkalized state" is used to mean the state where dispersed particles of the alkali metal aluminosilicate are combined with alkali metal ions or the dispersed particles and alkali metal ions have mutual actions with each other. Since the alkali aluminosilicate per se releases an alkali metal component, according to customary analysis means it is difficult to determine in what state the alkali component is present, though only the alkali metal component present in the free state can be determined. It is construed that the reason why the zeolite of this invention synthesized from a smectite clay mineral as the starting material has a particularly high buffer capacity (S) is that the alkali metal component is not present in the form of a free alkali or a crystalline alkali aluminosilicate but in an intermediate state, namely in the above-mentioned "alkalized" state.

By virtue of the above-mentioned neutralization or titration characteristic, the alkali aluminosilicate builder of this invention has such a property that when a 1% aqueous dipersion of the alkali aluminosilicate of this invention is boiled for 5 minutes, the pH of the boiled dispersion is ordinarily in the range of from 9.5 to 12, especially preferably in the range of from 9.8 to 11.5.

The alkali aluminsolicate builder of this invention has a novel feature that the primary particle size is smaller than 1 $\mu$ and the secondary particle size is smaller than 4 $\mu$. As pointed out hereinbefore, according to known methods, it is extremely difficult to prepare a synthetic zeolite builder in which substantially all of the particles have a primary particle size smaller tha 1 $\mu$. According to this invention, in contrast, such finely divided zeolite can easily be prepared an the dispersibility of the builder into water can be remarkably improved. As a result, according to this invention, it is possible to maintain the metal ion sequestrating property, the alkali buffer capacity and the re-contamination preventing effect at very high levels stably for a long time. Moreover, the rinsing property can be remarkably improved and troubles such as powder falling can be effectively prevented.

In the instant specification and claims, by the term "primary particle size" is meant a minimum size of the cubic particle of a zeolite, namely a length of edge of the cubic zeolite particle, observed on an electron-microscopic photography. More specifically, the primary particle size is determined according to the following method.

(v) Method for measurement of primary particle size ($D_p$):

In the instant specification, the "primary particle size" means a length of edge of cubic particles directly measured by an electron microscope in the state where respective particles are well dispersed. The measurement is performed according to the following method.

A suitable amount of a sample is placed on a glass sheet, and paraffin wax or vaseline in a volume substantially equal to the volume of the sample is added to the sample. The mixture is sufficiently kneaded by a small stainless steel spatula, and a small amount of ethanol is further added and the mixture is further kneaded. The kneaded mixture is placed on a mesh for electron-microscopic measurement and immersed in ethanol to dissolve out the paraffin or the like. Then, the sample is dried for 1 hour in a drier maintained at 60° to 70° C. to evaporate ethanol.

According to customary procedures, 4 electronmicroscopic photographs suitable for the measurement of the primary particle size are taken from different vision fields at a magnification of 1,000 to 2,000 and the photographs are enlarged 10 times to obtain photographs having a total magnification of 10,000 to 20,000.

Among cubic particles taken on these photographs, 6 typical particles are chosen and among sides or edges of these particles, those deemed to be in parallel to the plane of the vision field (the mesh plane) are chosen and the length of each of these sides is measured. The maximum value among the measured values is designated as the primary particle size ($D_p$) referred to in the instant specification.

Figure 6:
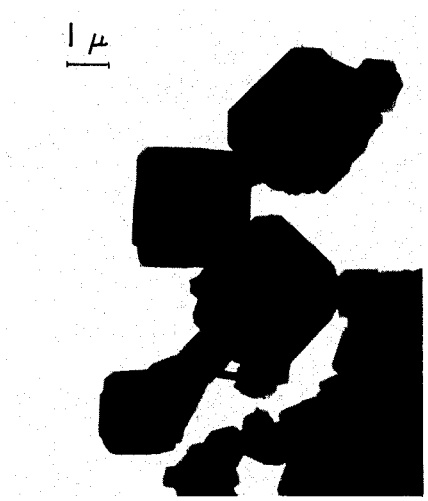
FIG. 6 illustrates an electron-microscope photograph of commercially available zeolite of the type 4A.
Figure 7:
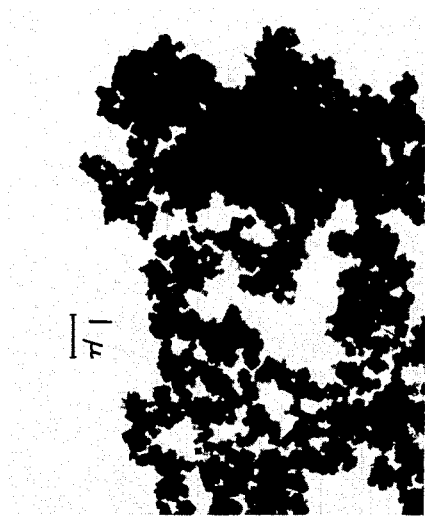
FIG. 7 illustrates an electron-microscope photograph of the zeolite builder of this invention.

FIG. 6 illustrates an electron-microscopic photograph of commercially available zeolite of the type 4A, and FIG. 7 illustrates an electron-microscopic photograph of the zeolite builder of this invention. From these FIGS., it will readily be understood that the builder of this invention has a remarkably fine primary particle size and is very excellent with respect to the uniformity of the particle size.

In the builder of this invention, not only the primary particle size is remarkably fine but also the size of practical powder, namely the secondary particle size, is remarkably fine and is smaller than 4 $\mu$. In the instant specification and claims, the secondary particle size is one that is determined according to the following method for measurement of the particle size distribution.

(vi) Method for measurement particle size distribution

The measurement is carried out by using an apparatus of the light scanning type for prompt measurement of the particle size distribution (model PSA-2 manufactured by Hitachi Seisakusho K.K.). Particles are suspended in a liquid, and the suspension is agitated to disperse the particles uniformly. Dispersed particles are sedimented with the lapse of time according to Stokes' law and the particle concentration distribution is generated in the liquid because of the difference of particle sizes. The particle size distribution is determined by utilizing this principle. Namely, the particle concentration distribution is optically measured after a certain period of time has passed from dispersing of the particles and is electrically recorded by converting optical signals to electric signals. Practical measurement procedures are as follows:

In a corked test tube (having a capacity of 10 ml) is charged 20 mg of a sample, and 5 ml of a 0.1% solution of sodium hexametaphosphate is added. The corked test tube is attached to a shaking device and the content is shaken at a rate of about 60 reciprocations per minute for 30 minutes to disperse the sample in the sodium hexametaphosphate solution. The dispersion is transferred into a measurement cell (8.5 cm in height, 2.0 cm in length and 2.0 cm in width), and deionized water is poured until the liquid level reaches precisely a standard line (50 ml). The cell is then set to the measurement apparatus, and the content of the cell is sufficiently stirred by an agitation rod and is then allowed to stand still. Simultaneously with stopping of the agitation, a stop-watch is actuated. Then, the apparatus is actuated to draw a particle size distribution curve and an approximate measurement time is examined. This operation is performed to know whether or not it is possible to obtain precise values. If deionized water has not been added precisely to the standard line, the top portion of the obtained curve is disturbed and precise values cannot be obtained. When it is confirmed by the above preliminary operation that a precise curve will be obtained, an automatic recorder is actuated to draw a particle size distribution curve. The measurement time and the density and viscosity of the liquid have been read in advance from a calculating table. Further, the particle size of the sample is calculated from a prescribed calculating paper. The recorded curve is divided in equal portions according to the so calculated particle size and the intensity of transmitted light on the dividing point of the curve is read and log I is then read from a logarithmic conversion scale. Based on the read value, the particle size distribution is calculated from a prescribed calculating paper.

In the instant specification, by the expression "3 – 4 $\mu$ (%)" is meant % by weight of particles having a size larger than 3 $\mu$ and not larger than 4 $\mu$.

Since both the primary particle size and the secondary particle size are very fine in the finely divided zeolite of this invention, it has a very excellent water-dispersibility and shows a very high suspension stability when it is actually used for washing in the state incorporated in a detergent composition. The water-dispersibility can be evaluated based on a rate of formation of a supernatant, namely a sedimentation speed, observed when an aqueous dispersion having a prescribed concentration is allowed to stand still. When the sedimentation speed of commercially available zeolite powder or of a zeolite obtained according to a known synthesis method is measured according to the measurement method described below, the sedimentation speed is higher than 9.4 cm/hr in any case. In contrast, the sedimentation speed of the zeolite builder of this invention, determined according to the same measurement method, is lower than 4 cm/hr. Thus, it is apparent that the builder of this invention is very excellent in the dispersibility and dispersion stability.

(vii) Method for measurement of sedimentation speed:

A sample is appropriately dried to reduce the water content to 5 to 6%, lightly pulverized in an agate mortar and passed through a sieve of 200 Tyler mesh.

The pulverized sample is dried for 2 hours in a drier maintained at 110° C. and naturally cooled to room temperature in a desiccator to form a test sample.

By a precision balance, 0.500 g of the test sample is weighed and added to 1000 ml ($\pm$ 1 ml) of deionized water maintained at 20° $\pm$ 2° C., and the mixture is agitated at a rate of 120 rpm in a jar tester for 5 minutes to form a suspension. The concentration of the so formed suspension is 0.05%.

After the above agitation conducted for 5 minutes in the jar tester, the suspension is immediately pured into a 100-ml graduated cylinder having a height of 22.5 cm and a diameter of 2.6 cm to a standard line indicating 100 ml (the height of this standard line is 18.7 cm from the bottom). When 30 minutes have passed from completion of the above pouring operation, the height (cm) of the layer of the supernatant is measured and the value of the sedimentation speed (cm/hr) is determined by multiplying the measured height value by 2.

Since the builder of this invention is composed of water-insoluble very fine particles, it has a high Methylene Blue-adsorbing property. By the term "Methylene Blue-adsorbing property" referred to in the instant specification and claims is meant a property of adsorbing Methylene Blue dye dissolved in water, and this property is evaluated according to the following measurement method. This Methylene Blue-adsorbing property is closely concerned with the stain-adsorbing property and hence, with the re-contamination preventing property of the builder.

(viii) Method for measurement of Methylene Blue-adsorbing property (AM):

(a) Preparation of test sample:

By a precision balance, 0.2 g of a sample is weighed, and it is suspended in 30 ml of deionized water at room temperature (20°$\pm$ 2° C.), and the hydrogen ion concentration (pH) of the suspension is measured by a glass electrode type pH meter (model HM-5A manufactured by Toa Denpa K. K.) The pH is adjusted to 10.5 $\pm$ 0.2 by addition of a 0.1N solution of sodium hydroxide (NaOH) or a 0.1N solution of hydrochloric acid (HCl). Then, 50 ml of a 8 ppm solution (pH = 10.5) of Methylene Blue EP ($C_{16}H_{18}N_3SCl \cdot nH_2O$) is added to the suspension. The mixture is shaken at a shaking rate of 140 reciprocations per minute and stroke of 8 cm for 15 minutes by a shaking machine. Then, the suspension is filtered by a filter paper No. 6 (specified by JIS) and the filtrate is used as a test sample. The measurement is carried out within 120 minutes from completion of the preparation of the test sample.

(b) Preparation of standard dye solutions for colorimetry:

By a precision balance, 1.000 g of Methylene Blue EP ($C_{16}H_{18}N_3SCl \cdot nH_2O$) is weighed, and it is then charged in a graduated cylinder having a capacity of 1 liter. A dye solution having a concentration of 0.1% is first prepared and it is then diluted to a concentration of 5 ppm, 1.67 ppm, 0.57 ppm or 0.278 ppm. These diluted dye solutions and deionized water are separately charged in colorimetric test tubes having a diameter of 25 mm, a length of 250 mm and a capacity of 100 ml. Chromatocities of the 5 ppm dye solution, 1.67 ppm dye solution, 0.577 ppm dye solution, 0.278 ppm dye solution and deionized water (transparent) are designated as 1, 2, 3, 4 and 5, respectively.

(c) Measurement method:

The test sample solution prepared above is charged in a test tube having a diameter of 25 mm and a length of 250 mm, and the color of the solution is compared with colors of the above 5 standard solutions under white light with the naked eye to determine the color concentration corresponding to the color concentration of the test sample solution. If the color of the sample solution is intermediate between colors of two standard solutions, the chromatocity is expressed as 1.5, 2.5, 3.5 or 4.5. Accordingly, when the test sample solution has a higher value of the chromatocity, it has a higher Methylene Blue-adsorbing property.

Since the builder of this invention has a very fine primary particle size, it has a very large surface area per unit weight and the capacity of adsorbing and retaining oil stains or geasy grimes is extremely high. This surface area characteristic can be evaluated by the bulk density and the oil absorption.

The builder of this invention has an oil absorption of at least 45 ml/100 g of the sample, especially at least 48 ml/100 g of the sample, as measured according to the following method, and it has a bulk density not higher than 0.5 g/cc, especially not higher than 0.48 g/cc, as measured according to the method described below.

(ix) Method for measurement of oil absorption (O.A.):

A sample is appropriately dried to reduce a water content to 5 to 6%, lightly pulverized in an agate mortar and passed through a sieve of 200 Tyler mesh.

The pulverized sample is dried for 2 hours in a drier maintained at 110° C. and naturally cooled to room temperature in a desiccator to form a test sample.

By a precision balance, 1.000 g of the test sample is weighed, and it is placed on a glass sheet. Refined linseed oil (first grade; manufactured by Wako Junyaku K. K.) is added to the center of the test sample little by little through a buret (minimum graduation = 0.01 ml) and every time one drop of linseed oil is added, the entire sample is kneaded by a spatula. This operation is repeated until the entire mixture is formed into one mass resembling a putty and it can be wound in a film-like form by the steel spatula. The volume (ml) of added refined linseed oil is multiplied by 100 and the obtained value is designated as the oil absorption (O.A.) (ml/100 g of the sample).

(x) Method for measurement of bulk density:

A sample is appropriately dried to reduce the water content to 5 to 6%, lightly pulverized in an agate mortar and passed through a sieve of 200 Tyler mesh.

The pulverized sample is dried for 2 hours in a drier maintained at 110° C. and naturally dried to room temperature in a desiccator to form a test sample.

The bulk density is determined according to the so called iron cylinder method using iron cylinder and plunger described below. A plunger is correctly let to fall naturally into a clean cylinder and the height ($H_o$) of the upper projecting portion of the plunger is read (to the order of 1/10 mm).

Then, the plunger is taken out, and 1.00 g of the test sample weighed by a precision balance is quietly poured into the cylinder while preventing scattering of the test sample. The sample adhering to the wall face of the cylinder is let to fall by lightly moving the cylinder or imparting a light shock to the cylinder, and the level of the test sample in the cylinder is thus made flat. Then, the plunger is gently and correctly let to fall into the cylinder from above while lightly supporting the plunger with the fingers.

In principle, the time required for the plunger to reach the level of the test sample in the cylinder is set as 5 seconds. When the plunger reaches the sample level, the plunger is caused to make one rotation while lightly supporting the plunger with the fingers so that the plunger gets intimate with the test sample.

The plunger is allowed to stand in this state for 5 minutes, and the height (H) of the upper projecting portion is read and the bulk density (B.D.) is calculated according to the following formula:

$$B.D. = \frac{S}{(H - H_o) \times 3.8}$$

wherein B.D. stands for the bulk density, $H_o$ designates the length (cm) of the projecting portion of the plunger before packing of the test sample, H stands for the length (cm) of the projecting portion of the plunger in the presence of the test sample, and S denotes the weight (g) of the test sample.

Standards of the cylinder and plunger that are used in the above-mentioned measuring method are as follows:

Plunger

Weight: 190 g
Outer diameter: 21.80 ± 0.05 mm
Total height: 115.0 mm
Material: iron (having a hollow structure)

Cylinder

Inner diameter: 22.00 ± 0.05 mm
Height: 100.0 mm (from the bottom of the cylinder)

In addition to the above-mentioned excellent water dispersibility, the builder of this invention has such a specific characteristic that not only before exchange of calcium ion but also after exchange of calcium ion the surface potential of the builder dispersed in water is uniformly kept negative. As pointed out hereinbefore, clothes and other fibrous articles in the washing liquid are negatively charged, and therefore, when fine particles of the builder are uniformly charged negatively at the washing and rinsing steps, adhesion of the builder particles to clothes and the like is remarkably controlled, and a good rinsing state can be attained and troubles such as powder falling can be effectively prevented. When the measurement is carried out according to the method described below, it is seen that the builder of this invention is remarkably excellent over known zeolites with respect to the property of retaining the negative charge after exchange of calcium ion, and therefore, it is apparent that the builder of this invention is excellent over known zeolites with respect to the rinsing property and prevention of such troubles as powder falling.

The surface charge characteristic of the alkali aluminosilicate can be determined according to the following measurement method.

(xi) Method for electrophoretic determination of adhesion of zeolite particles to anode after exchange of calcium ion:

A box-type vessel composed of a methyl methacrylate resin (inner dimensions = 31 mm × 85 mm × 129 mm) is charged with 200 ml of deionized water. A zeolite sample is dried, pulverized and passed through a sieve of 200 Tyler mesh, and the resulting powdery zeolite is dried for 2 hours in a drier maintained at 110° C. to form a test sample. In the above-mentioned deionized water is suspended 0.2 g of the so formed test sample. Two platinum plates (each having a size of 0.25 mm × 80 mm × 100 mm) are set as electrodes in the box-type vessel with a clearance of 30.5 cm therebetween so that the platinum plates are contacted with both the side faces of the box-type vessel, respectively. A direct current voltage is applied between the two electrodes to flow an electric current of 0.1 A for 10 minutes. After completion of application of electricity, the states of adhesion of powder particles to the anode and cathode surfaces are examined with the naked eye and evaluated according to the following scale:

5: the powder adheres to the entire surface of the anode but does not adhere to the surface of the cathode at all.
4: the powder adheres partially to the surface of the anode but it hardly adheres to the surface of the cathode.
3: the powder hardly adheres to the surface of the anode or the surface of the cathode.
2: the powder hardly adheres to the surface of the anode but adheres partially to the surface of the cathode.
1: the powder does not adhere to the surface of the anode but it adheres to the entire surface of the cathode.

ACID TREATMENT OF SMECTITE CLAY MINERAL

In the preparation of the zeolite builder of this invention, a smectite clay mineral is first subjected to the acid treatment under such conditions that at least the X-ray diffraction peak of the plane index [001] substantially disappears, to thereby form activated silica or activated alumina-silica.

In this invention, as the smectite clay mineral, there can be used, for example, so called montmorillonite clay minerals such as acid clay, bentonite, subbentonite and Fuller's earth, and beidellite, saponite and nontronite. These clay minerals may be used singly or in the form of a mixture of two or more of them. Further, these clay minerals may be used in the form of mixtures with other type clay minerals. Moreover, naturally modified smectite clay minerals, for example, a clay having a slightly destroyed smectite multi-layer structure, which is produced at Sanko, Shibata city, Niigata prefecture, Japan, may also be used in this invention.

In general, a smectite clay mineral has as the basic structure a three-layer structure comprising a central octahedral layer sandwiched between two tetrahedral layers of $SiO_2$, and a great number of these basic three-layer structures are laminated in the direction of the axis C to form a multi-layer crystal structure inherent of the smectite clay mineral. The acid treatment is carried out under such conditions that this multi-layer crystal structure is substantially destroyed; namely the X-ray diffraction peak of the plane index [001] substantially disappears. By this acid treatment, it is made possible to obtain a zeolite having a high calcium binding property and a very fine primary particle size.

FIG. 8 illustrates an X-ray diffraction pattern of acid clay produced at Nakajo, Niigata prefecture, Japan, and FIG. 9 illustrates an X-ray diffraction pattern of alumina-silica treated under conditions 1-2 of Example 5 given hereinafter, in which destruction of the multi-layer crystal structure by the acid treatment is insufficient. FIGS. 10 and 11 illustrate X-ray diffraction patterns of alumina-silica obtained in Example 5 hereinafter, in which the multi-layer crystal structure is completely destroyed by the acid treatment. In samples shown in FIGS. 8 and 9, the X-ray diffraction peak of the plane index [001] is clearly left, but in samples shown in FIGS. 10 and 11, the X-ray diffraction peak of the plane index [001] substantially disappears.

From results obtained in Example 5 given hereinafter, it will readily be understood that destruction of the multi-layer crystal structure is important for obtaining a zeolite having an excellent calcium binding property and a very fine primary particle size. For example, if there is employed acid clay per se having an X-ray diffraction pattern shown in FIG. 8 or aluminosilica in which destruction of the multi-layer crystal structure is insufficient, such as sample 5-2 shown in FIG. 9 and Table 12 given hereinafter, crystallization to a zeolitic structure is insufficient and properties of the builder, such as the calcium binding property, are degraded. Further, in such case, the primary particle size is larger than 1 $\mu$ and the intended objects of this invention cannot be attained. In contrast, when alumina-silica having X-ray diffraction patterns as shown in FIGS. 10 and 11, which have been acid-treated according to this invention, higher crystallization to a zeolitic structure can be attained under the same zeolite-forming conditions and excellent builder characteristics can be obtained. Moreover, a builder having a very fine primary particle size can be obtained.

In this invention, in order to obtain a zeolite builder having a very fine primary particle size and preferred characteristics, it is desirable for the activated silica or alumina-silica obtained by the acid treatment to have a degree of the crystal destruction (D.C.) lower than 15%, especially lower than 5%, as measured according to the method described below, with respect to the peak of the plane index [001].

(xii) Method for determination of degree of crystal destruction (D.C.):

X-ray diffraction patterns of the starting raw clay mineral and acid-treated clay mineral are obtained according to the method for determining X-ray diffraction patterns, which has been described in (i) above.

With respect to each of the X-ray diffraction patterns of the starting and acid-treated clays, the height of the peak of the plane index [001] (when the measurement is carried out under conditions specified in this invention, the peak of the plane index [001] appears at 4° to 7°, which differs to some extent depending on the kind of the clay) and the height of the peak of the plane indexes [110] and [020] (when the measurement is carried out under conditions specified in this invention, a single peak of the plane indexes [110] and [020] appears at 19.6° to 19.9°) are measured, and [001] D.C. and [020] D.C. values (%) are calculated according to the formula given below and the degree of crystal destruction by the acid treatment is evaluated based on these values.

$$[001] D.C. (\%) = \frac{\text{(peak height of plane index [001] of acid-treated clay)}}{\text{(peak height of plane index [001] of starting raw clay)}} \times 100$$

$$[020] D.C. (\%) = \frac{\text{(peak height of plane indexes [110] and [020] of acid-treated clay)}}{\text{(peak height of plane indexes [110] and [020] of starting clay)}} \times 100$$

In this invention, in order to obtain a zeolite builder having a finest primary particle size and being most excellent in builder characteristics, it is preferred that the acid treatment be carried out under such conditions that the value of [020] D.C. is lower than 15%, especially lower than 5%; namely even the basic three-layer structure of the starting clay is substantially destroyed.

The acid treatment of the smectite clay mineral can be performed by known methods, so far as the above-mentioned requirement is satisfied. As the acid, there can be used, for example, mineral acids such as sulfuric acid, hydrochloric acid and nitric acid, and organic acids such as benzene-sulfonic acid, toluene-sulfonic acid and acetic acid. However, a mineral acid such as sulfuric acid is ordinarily used. The contact of the clay with the acid may be performed according to known methods, and methods for the acid treatment of clays, which were previously proposed by us, can be effectively and preferably adopted (see Japanese Patent Publications Nos. 5666/53, 112/54, 2169/54, 2960/57, 11208/70, 11209/70, 44154/72, etc.). For example, the so-called slurry activation method in which a clay is contacted with an acid in the slurry state, the so-called granule activation method in which a granulated clay is subjected to solid-liquid contact with an acid and the so-called dry activation method in which a mixture of a clay and an acid is reacted in the dry state (in the granulated form) and then, the resulting salts are extracted may be adopted for accomplishing the acid treatment of this invention.

The concentration of the acid used for the acid treatment, the treatment temperature and the treatment time are changed depending on the kind of the clay mineral and the treatment method, and it is difficult to specify these conditions. For example, when the acid treatment is performed according to the dry method, a smectite clay mineral such as mentioned above is intimately contacted with 0.3 to 1.5 equivalents, especially 0.5 to 1.2 equivalents, based on the basic component in the clay, of an acid as it is or in the form of an aqueous solution in such a proportion that the amount of the acid or its aqueous solution is 0.5 to 1.2 parts by weight per part by weight of the clay on the dry basis, to thereby form directly a plastic or solid reaction product and this reaction product is treated in an aqueous medium at a pH lower than 1 to remove the basic metal component in the reaction product by extraction. The basic metal component referred to includes all the basic components contained in the clay, such as alkali metal, alkaline earth metal, iron and aluminum components. When the mixing ratio of the clay and the acid or its aqueous solution is maintained in the above-mentioned range, a solid or creamy admixture is formed. This admixture is maintained at 60° to 300° C. for 10 to 600 minutes under such conditions that the X-ray diffraction peak of the plane index [001] substantially disappears, whereby the reaction is completed. Then, soluble basic components in the reaction product are extracted and removed by treating the reaction mixture in an aqueous medium having a pH lower than 1, preferably a pH lower than 0.5. In order to prevent hydrolysis of the soluble basic components, it is important that the removal and extraction of the basic components should be performed under the above-mentioned pH conditions. If colloidal iron components formed by hydrolysis are included in the resulting activated alumina-silica, there is often observed a tendency that the yield of the resulting synthetic zeolite or the degree of crystallization is considerably reduced.

When activated alumina-silica is prepared by the acid treatment by solid-liquid contact of a granulated clay and a mineral acid, the mineral acid having a concentration of 10 to 98% is added to the clay in an amount of 0.01 to 0.1 part by weight per part by weight of the clay on the dry basis and the mixture is granulated to form a granular product which will not be disintegrated under conditions of the subsequent acid treatment. This non-disintegratable granulated clay is immersed in an aqueous solution of a mineral acid having a concentration of 5 to 72%, especially 10 to 50%, at a temperature in the range of from room temperature to the boiling point of the acid solution for 0.5 to 100 hours so that the X-ray diffraction peak of the plane index [001] substantially disappears in the clay.

The acid treatment of the clay mineral can also be accomplished according to the wet method in which the clay is dispersed in a mineral acid such as sulfuric acid having a concentration of 5 to 98% and the clay is treated in the slurry state. In this case, the acid treatment conditions may be the same as those adopted in the above-mentioned acid treatment for the granulated clay.

In this invention, activated silica or activated alumina-silica is thus formed according to the degree of the acid treatment. This product has much higher activities, especially a much higher surface activity, than the untreated clay mineral or a product acid-treated under conditions outside the range specified in this invention. More specifically, the activated alumina-silica intermediate that is used in this invention has an aromatic adsorption index (AAI) of at least 16, especially 20 to 60, as measured according to the method described below. In view of the fact that untreated clay minerals have, in general, an AAI value lower than 15, it will readily be understood that the activated silica or alumina-silica formed by the above-mentioned acid treatment has a remarkably high surface activity. It is believed that because of this high surface activity, a synthetic zeolite for a detergent builder which has a very fine primary particle size and an excellent crystallinity can be obtained from this intermediate according to this invention.

(xiii) Method for determination of AAI values:

A sample which has been appropriately pulverized in a mortar in advance is charged in a plugged weighing bottle having a suitable capacity, and the bottle is allowed to stand still for 3 hours in a drier maintained at 150° ± 5° C. and then placed in a desiccator. The content is thus cooled to room temperature naturally to form a test sample.

In a clean test tube for a centrifuge is charged 1 ± 0.005 g of the test sample, and 2 ± 0.05 cc of a liquid mixture comprising 30 parts by volume of dehydrated toluene and 70 parts by volume of dehydrated isooctane is added to the test sample by using a microburet. Then, the test tube is plugged and is shaken with a shaking angle of about 60° from the vertical line while the head of the tube is being lightly pressed, to thereby disperse the sample sufficiently in the liquid.

A rubber cap is set on the head portion of the test tube so as to prevent falling-out of the plug of the tube, and the test tube is attached to a shaking machine and shaken at a rate of 100 reciprocations per minute. Then, the test tube is subjected to an action of a centrifuge to form a supernatant. Refractive indexes of the obtained supernatant and the starting liquid mixture are measured by Abbe's refractometer, and the AAI value (the aromatic adsorption index) is calculated according to the following formula:

$$\text{Aromatic adsorption index (AAI)} = [(n\frac{20}{D})_1 - (n\frac{20}{D})_2] \times 10^4$$

wherein $(n\frac{20}{D})_1$ denotes the refractive index of the liquid mixture comprising 30 parts by volume of toluene and 70 parts by volume of isooctane, and $(n\frac{20}{D})_2$ represents the refractive index of the supernatant.

ALKALI PRE-TREATMENT

One of important features of this invention resides in the novel finding that when the activated silica or activated aluminosilica obtained by the acid treatment of a smectite clay mineral such as mentioned above is treated with an alkali hydroxide or a water-soluble alkali metal silicate prior to the synthesis of the intended zeolite to form an alkali metal polysilicate or alkali metal polyaluminosilicate having a composition in which the $Na_2O/SiO_2$ molar ratio is in the range of from 1/3.5 to 1/500, preferably from ¼ to 1/400, especially preferably from 1/7 to 1/300, a zeolite having an extremely fine particle size and being excellent in various builder characteristics can be obtained.

More specifically, as in case of sample H-3 shown in Example 2 given hereinafter, if activated silica obtained by the acid treatment of a smectite clay mineral is directly mixed with aluminum and alkali metal components and water and the mixture is subjected to zeolite-crystallizing-out reaction, the resulting zeolite has a primary particle size larger than 1 μ and is still insufficient in the water dispersibility and rinsing property. Further, as in case of sample H-4 shown in Example 2, if an alkali hydroxide is added to activated silica obtained by the acid treatment of a smectite clay mineral so that a composition substantially same as the composition of commercially available water glass can be attained and additional amounts of aluminum and alkali metal components and water are added to the resulting reaction product to effect zeolite-crystallizing-out reaction, the resulting zeolite has a primary particle size considerably larger than 1 μ and a builder excellent in such properties as the water dispersibility and rinsing property cannot be obtained at all. In contrast, to our great surprise, if an alkali metal hydroxide or water-soluble alkali metal silicate is added to an acid-treated clay so that the $Na_2O/SiO_2$ molar ratio is within the above-mentioned range and the pre-treatment (preliminary aging treatment) is conducted, a finely divided zeolite having a primary particle size smaller than 1 μ can be exceptionally obtained. This fact will be apparent from results obtained in respective Examples given hereinafter.

The reason why a finely divided zeolite having a primary particle size smaller than 1 μ can be obtained by the specific combination of the acid treatment of a smectite clay mineral and the alkali pre-treatment in this invention has not been completely elucidated. However, it is construed that for formation of such fine zeolite there must be present a great number of crystal nuclei in the zeolite-crystallizing-out reaction system or the nucleus-forming speed should be very high while the crystal-forming speed is low and if an intermediate formed by acid-treating a smectite clay mineral and treating the acid-treated clay with an alkali is used as a raw material for synthesis of a zeolite, such requirement is effectively satisfied. In this invention, the multi-layer crystal structure of a smectite clay mineral, preferably together with the basic three-layer structure, is destroyed by the acid treatment, and it is believed that by the subsequent alkali pre-treatment the tetrahedral layer composed of $SiO_4$ is combined with the alkali and this provides promptly a great number of crystal nuclei at the zeolite-crystallizing-out rection. If the acid-treated clay is directly subjected to the zeolite-forming reaction without the alkali pretreatment, the speed of formation of nuclei is very low and resulting zeolite particles are coarsened. It is construed that when water-soluble sodium silicate is directly employed as the starting material for the synthesis of a zeolite or when the acid-treated clay is pre-treated with an alkali in an amount more than the amount specified in this invention, since the silica component is dissolved in an aqueous solution in the form of a monomer or oligomer, the nucleus-forming speed is relatively low and hence, the resulting zeolite particles are coarsened.

The pre-treatment of the acid-treated clay with an alkali metal hydroxide or a water-soluble alkali metal silicate may be accomplished by optional methods, so far as the above-mentioned $Na_2O/SiO_2$ molar ratio requirement is satisfied and both the components are intimately contacted with each other. In general, in order to attain an intimate contact between both the components, it is preferred that both the components be contacted in the presence of water in an amount of 1 to 49 parts by weight, especially 2 to 19 parts by weight, per part by weight of the acid-treated clay. This water may be incorporated into either the acid-treated clay or the alkali metal hydroxide or water-soluble alkali metal silicate or in both of them. In general, it is preferred that an aqueous slurry of the acid-treated clay be mixed with an aqueous solution of the alkali metal hydroxide or water-soluble alkali metal silicate.

Since the acid-treated clay per se has a high activity, good results are obtained even when the pretreatment is carried out at room temperature, but if desired, the temperature may be elevated to about 70° C. A preferred pre-treatment temperature is in the range of from room temperature to the boiling point of the mixture, especially from 20° to 95° C. The time for aging the mixture of both the components is changed depending on the temperature, but in general, the pretreatment is carried out for 0.2 to 100 hours, especially 2 to 50 hours.

The pre-treatment may be performed under atmospheric pressure, but if desired, the pre-treatment can be conducted under heating at a pressure of up to about 5 atmospheres (gauge) in an autoclave or other sealed vessel. It also is possible to perform the pre-treatment in a drying atmosphere. In this case, the pre-treatment can be completed while drying the mixture of the acid-treated clay and alkali component. When the mixture of the acid-treated clay and alkali component is in a pasty or plastic state, the mixture may be molded into granules, and the granules may be steamed in a water vapor atmosphere and dried or heated, whereby the intended pre-treatment is accomplished.

ADJUSTMENT OF PARTICLE SIZE

In order to obtain a finely divided zeolite in this invention, it is preferred that the particle size of the alkali metal polysilicate or alkali metal polyaluminosilicate to be used for the zeolite-crystallizing-out reaction be adjusted so that particles having a size smaller than 5 $\mu$ occupy at least 20% by weight, especially 50% by weight, of the total particles and particles having a size larger than 20 $\mu$ occupy less than 30% by weight, especially less than 10% by weight, of the total particles.

This particle size adjustment may be performed before the acid treatment, during the acid treatment, after the acid treatment (before the alkali treatment), during the alkali treatment or after the alkali treatment. If desired, it is possible to perform this particle size adjustment in two or more stages, for example, during the acid treatment and during the alkali treatment. For example, when the starting clay to be subjected to the acid treatment is subjected to one or more of dry and wet pulverizing operations and classifying operations using a hydrualic elutriation, an air elutriation, a liquid cyclone, a fluidized bed and the like, the particle size of the raw material for the alkali metal polysilicate or polyaluminosilicate can be accomplished. When the particle size adjustment is thus made on the starting clay, impurities such as stone and sand contained in the raw clay mineral are effectively removed and a silica or aluminosilica intermediate having an enhanced reactivity can be obtained. Therefore, in this invention, there is advantageously adopted, for example, a method in which a fluidizing gas is blown into an as-produced starting smectite clay mineral under agitation to separate the raw material into an upper fluidized layer of fine clay particles and a lower fixed or slightly fluidized layer of coarse particles containing stone, sand and other impurities.

Further, an alkali metal polysilicate or alkali metal polyaluminosilicate intermediate for the synthesis of a finely divided zeolite, which has the above-mentioned particle size distribution, can be obtained by wet-pulverizing an acid-treated clay (acid-washed clay) or an alkali-treated product in a pulverizer such as a ball mill, a tube mill, a mixer, an attritor, a shaking mill or the like and if necessary, classifying the resulting particles by a liquid cyclone or the like.

Of course, it is possible to perform the particle size adjustment simultaneously with the acid treatment or the alkali treatment. In this case, a slurry of the starting clay and an acid or a slurry of the acid-treated clay and an alkali is preferably treated in a pulverizer such as a ball mill or a mixer or a highly shearing agitator. The slurry is passed through a classifying machine such as a liquid cyclone during the acid or alkali treatment or after the acid or alkali treatment to collect particles having a desirable size. By any of the foregoing particle size adjustment treatments, an intermediate having the above-mentioned desirable particle size distribution can be obtained.

If necessary, such treatments as water washing and drying may be performed before or after the acid treatment, the alkali treatment and the particle size adjustment. The alkali metal polysilicate or polyaluminosilicate intermediate, which has been subjected to the above-mentioned treatments, is used for the synthesis of the intended zeolite in an optional form, for example, a dry powder, a cake or a slurry.

PREPARATION OF HOMOGENEOUS MIXTURE

According to the process of this invention, the above-mentioned finely divided alkali metal polysilicate or polyaluminosilicate is mixed with additional amounts of alumina and alkali metal components and water and the mixture is aged to form a homogeneous admixture having a composition capable of forming zeolite of the type A.

As the alumina component, there can be used, for example, fine powders of amorphous alumina such as hydrogel and xerogel of aluminum hydroxide, alumina monohydrate such as boehmite and pseudo-boehmite, alumina trihydrate such as bayerite, gibbsite and nordstrandite, and active alumina such as $\gamma$-alumina, $\eta$-alumina, $\delta$-alumina, $\kappa$-alumina, $\theta$-alumina, $\chi$-alumina and -alumina. As the alkali metal component, there can be preferably employed alkali metal hydroxides such as sodium hydroxide, potassium hydroxide and lithium hydroxide. The alumina and alkali metal components may be used in the form of a compound or mixture of both the components. Use of an alkali metal aluminate is especially preferred. When an alkali metal aluminate is employed, if an excessive amount of the alumina or alkali metal components is necessary, such component is fed to the reaction system in the form incorporated into the alkali metal aluminate.

In this invention, the alkali metal polysilicate or alkali metal polyaluminosilicate is mixed with additional amounts of alumina and alkali metal components and water at known mixing ratios. In known processes for production of zeolite of the type A, zeolite-forming components are used at the following ratios (based on the oxides):

|  | Ordinary Range | Preferred Range |
| --- | --- | --- |
| $SiO_2/Al_2O_3$ | 0.06 – 5 | 0.1 – 3.5 |
| $Na_2O/SiO_2$ | 0.3 – 18 | 0.5 – 5 |
| $H_2O/Na_2O$ | 4 – 300 | 15 – 150 |

In this invention, the foregoing components are mixed together so that the above mixing ratios are attained.

However, in this invention, in order to prepare a synthetic zeolite having a fine particle size and being excellent in builder effects from an alkali metal polysilicate or alkali metal polyaluminosilicate intermediate derived from a smectite clay mineral, it is preferred that attention be paid to the following points.

It is first of all preferred to avoid direct addition of an alkali metal hydroxide to the alkali metal polysilicate or alkali metal polyaluminosilicate in such an amount as will solubilize said intermediate. When this intermediate is directly mixed with a large amount of an alkali metal hydroxide, a zeolite having a coarse particle size tends to crystallize out, and this tendency is especially conspicuous when a water-soluble alkali metal silicate is used as the silica component. Accordingly, it is most preferred that an alkaline aqueous solution of an alkali metal aluminate be gradually added to an aqueous dispersion of the alkali metal polysilicate or alkali metal polyaluminosilicate. Of course, an aqueous dispersion of the alkali metal polysilicate or alkali metal polyaluminosilicate and a solution of an alkali metal aluminate may be added continuously or intermittently into water simultaneously or alternately.

In this invention, since a solid silicate or aluminosilicate intermediate is used for the synthesis of zeolite, at the step of mixing zeolite-forming components there is an optimum alkali concentration for obtaining a zeolite having a high degree of crystallization and a fine particle size, and it generally is preferred that an alkali concentration (CA, mole %) defined by the following formula be in the range of from 7 to 0.25 mole %, especially from 5 to 0.5 mole %:

$$CA \text{ (mole \%)} = \frac{[Na_2O]}{[SiO_2] + [Al_2O_3] + [Na_2O] + [H_2O]} \times 100$$

wherein $[SiO_2]$, $[Al_2O_3]$, $[Na_2O]$ and $[H_2O]$ represent mole numbers of $SiO_2$, $Al_2O_3$, $Na_2O$ and $H_2O$, respectively, in the mixture.

Moreover, in order to prepare a zeolite having a high degree of crystallization and a fine particle size while controlling formation of sodalite hydrate effectively, it is preferred that at the step of mixing the zeolite-forming components the alkali concentration be adjusted so as to satisfy requirements expressed by the following empirical formulae depending on the temperature and time for crystallizing out zeolite:

$$24 \geq t \cdot \exp[1.3 \times 10^4 (\frac{1}{363} - \frac{1}{T})] \geq 0.5 \quad (1)$$
and
$$6 - 0.12T \cdot \exp[1.3 \times 10^4 (\frac{1}{363} - \frac{1}{T})] \geq CA \quad (2)$$

wherein $t$ stands for the crystallizing-out time (hr), $T$ stands for the crystallizing-out temperature (° K, absolute temperature), and $CA$ stands for an alkali concentration (mole %) in the zeolite-forming homogeneous mixture.

When the above alkali concentration is higher than 7 mole %, the tendency of crystallization of sodalite hydrate is enhanced as compared with the case where the alkali concentration is in the above-mentioned range, though this tendency differs to some extent depending on the temperature or time for mixing the zeolite-forming components as described hereinafter. A sodalite hydrate-containing zeolite is inferior in the calcium binding property and the washing power is low when it is used for a detergent builder. When the alkali concentration is lower than the above range, the resulting zeolite tends to have coarser particles, and the rate of the reaction tends to decrease considerably.

Another point that must be taken into consideration at the step of mixing zeolite-forming components is that incorporation of colloidal iron compounds such as colloidal iron hydroxide into the reaction mixture must be avoided as much as possible. In general, industrially available alkali metal aluminates contain about 100 to about 5000 ppm, based on the oxide of colloidal iron. We have found that if a commercially available alkali metal aluminate is used for the synthesis of zeolite as it is, a long time is required for crystallization and sodalite hydrate is formed, resulting in reduction of the calcium binding property, and that the resulting zeolite is colored reddish brown beyond an allowable limit. It has been found that this defect can easily be overcome by simple means. More specifically, if such commercially available alkali metal aluminate is diluted with water so that the concentration as $Al_2O_3$ is 3 to 20% by weight, cohesion is caused in the coloidal iron compounds to form flocs and if the so formed flocs are separated by filtration, the concentration of colloidal iron can be reduced to a level lower than 50 ppm as $Fe_2O_3$.

When a commercially available sodium silicate solution is mixed with a commercially available sodium aluminate solution, since the respective components are gelled and highly viscous, a heterogeneous gel is readily formed. In contrast, in this invention, by using the above-mentioned specific zeolite-forming materials and adopting the above-mentioned specific mixing method, an entirely homogeneous slurry can easily be obtained without such difficulty. This slurry may be aged under agitation, if desired. The aging temperature and time are not particularly critical, but in general, it is preferred that the aging be carried out at 0° to 50° C., especially 10° to 30° C., for 0.1 to 100 hours, especially 1 to 20 hours.

CRYSTALLIZING-OUT OF SYNTHETIC ZEOLITE

According to the process of this invention, the above-mentioned homogeneous admixture having a specific composition is heated to crystallize out a finely divided zeolite having a primary particle size smaller than 1 $\mu$.

Crystallizing-out of a crystalline alkali metal aluminosilicate can be accomplished under known conditions, but in general, it is preferred to crystallize out zeolite particles from a slurry at a temperature of 60° to 200° C., especially 70° to 100° C., over a period of 0.1 to 500 hours, especially 0.5 to 50 hours. Of course, it is possible to conduct crystallizing-out of zeolite particles under a pressure generated by the reaction or under pressurization with an inert gas by using an autoclave or other pressure vessel. In this invention, however, adoption of such conditions is not necessary at all, but zeolite particles can be crystallized out under mild conditions.

Agitation conditions are not particularly critical at the step of crystallizing out zeolite, but an ordinary crystallizing tank equipped with an ordinary agitator can be used conveniently in this invention.

In order to obtain a synthetic zeolite especially valuable as a detergent builder, it is preferred that zeolite be crystallized out under such alkali concentration, temperature and time conditions as will satisfy requirements represented by the following empirical formulae:

$$24 \geq t \cdot \exp [1.3 \times 10^4 (\frac{1}{363} - \frac{1}{T})] \geq 0.5$$
$$6 - 0.12t \cdot \exp [1.3 \times 10^4 (\frac{1}{363} - \frac{1}{T})] \geq CA$$

wherein $t$ stands for the crystallizing-out time (hr), $T$ stands for the crystallizing-out temperature (° K, absolute temperature), and $CA$ stands for an alkali concentration (mole %) in the zeolite-forming homogeneous mixture.

If the above requirements are satisfied at the crystallizing-out step, formation of sodalite, which is often observed in preparing zeolites from clay minerals, can be effectively controlled.

The so formed zeolite composed of very fine particles can be used as a synthetic zeolite product as a detergent builder as it is in the as-prepared slurry form or after it has been subjected to a known solid-liquid separation operation such as filtration or centrifugal separation and to water washing and drying.

The crystallized-out synthetic zeolite is separated from the mother liquor in the state where it contains at least a part of the excessive alkali included in the mother liquor, and an acid or acidic salt is added to the so separated composition and the alkali is neutralized under such a condition that the pH of the composition is higher than 9.0, whereby the buffer capacity (S) of the zeolite can be remarkably improved. As such acid or acidic salt, there can be employed those having a pKa value of at least 2, especially at least 2.5, for example, phosphorus oxy acids such as phosphoric acid, phosphorous acid and metaphosphoric acid, acidic salts of these phosphorus oxy acids, inorganic acids such as carbonic acid, boric acid, monosodium borate and activated silicic acid solutions, organic acids such as citric acid, oxalic acid, tartaric acid, succinic acid, maleic acid, malonic acid, gluconic acid, itaconic acid, thioglycolic acid, ethylenediamine-tetraacetic acid, nitrilotriacetic acid, diglycolic acid, sulfoitaconic acid, trimesic acid, pyromellitic acid, polyacrylic acid, maleic anhydride-methyl vinyl ether copolymers and CMC, and acidic salts of these inorganic and organic acids.

When phosphoric acid or its acidic salt is used for neutralizing the excessive alkali, by heating the resulting phosphate-containing zeolite at an elevated temperature, for example, 300° C. or higher, the phosphate may be converted to a condensed phosphoric acid salt, for example, a pyrophosphate.

USE

The synthetic zeolite for a detergent builder according to this invention can be combined with various surface active agents and be used as detergent compositions. As such surface active agent, there can be mentioned, for example, anionic surface active agents such as sodium salts of fatty acids, sodium salts of higher alcohol-sulfuric acid esters, sodium alkyl benzenesulfonates, sodium salts of alkyl sulfates, alkylolamide sulfuric acid esters, $\alpha$-olefin sulfonate sodium alkyl sulfonates, sodium alkyl naphthalene-sulfonates, sulfonated fatty acid esters, sulfonated heterocyclic compounds, sulfonated fatty acid amides sodium dialkyl sulfosuccinates, fatty acid-amino acid condensates and Turkey red oil, non-ionic surface active agents such as polyoxyethylene alkyl ethers, polyoxyethylene alkyl aryl ethers, polyethylene glycol fatty acid esters, polyoxyethylene fatty acid esters, polyoxyethylene fatty acid amide esters, polyhydric alcohol fatty acid esters, polyoxyethylene polyhydric alcohol fatty acid esters and alkylol amides, and amphoteric surface active agents such as betaine type surface active agents, imidazoline type surface active agents, sulfonic acid type amphoteric surface active agents and alanine type amphoteric surface active agents. These surface active agents may be used singly or in the form of mixtures of two or more of them.

The so formed detergent compositions may further comprise one or more of other inorganic and organic builders according to the intended use. As the inorganic builder, there can be mentioned, for example, polysilicate builders, sodium carbonate, sodium bicarbonate, sodium sesquicarbonate, sodium orthophosphate, sodium pyrophosphate, potassium pyrophosphate, sodium tripolyphosphate, sodium tetraphosphate, sodium hexamethaphosphate, borax, sodium chloride and sodium borate. As the organic builder, there can be mentioned, for example, sodium citrate, sodium oxalate, CMC, sodium nitrilotriacetate, sodium diglycolate, sodium gluconate, sodium hydroxysuccinate, sodium mellitate, sodium ethylenediaminetetraacetate, sodium polymaleate, sodium polyitaconate, sodium polymesaconate, sodium polyfumarate, sodium polyaconitate, sodium polycitraconate, sodium polymethylene-malonate, sodium carboxymethoxymalonate, sodium carboxymethoxysuccinate, sodium cis-cyclohexanehaxacarboxylate, sodium cis-cyclopentane-tetracarboxylate and sodium phloroglucinol-trisulfonate.

These detergent composition may further comprise known additives customarily used in this field, for example, bubble-controlling agents, fluorescent whitening agents, bluing agents, other colorants, perfumes and caking preventing agents.

The synthetic zeolite of this invention is incorporated in a detergent composition in an amount of 0.1 to 95 % by weight, especially 1 to 50 % by weight, based on solids, though this amount is changed to some extent depending on the intended use of the detergent.

By virtue of the above-mentioned various characteristic properties, the synthetic zeolite builder of this invention can be used effectively for powdery and granular detergents, especially household powdery and granular detergents. Further, it must be noted that the foregoing various advantages of the synthetic zeolite of this invention can similarly be attained when they are used for various dry-cleaning detergents, liquid detergents, solid soaps, powdery soaps, washing powders, detergents for table wares, detergents for glass and tiles and detergents for automobiles.

This invention will now be described in detail by reference to the following Examples and Comparative Examples that by no means limit the scope of this invention.

EXAMPLE 1

This Example illustrates the preparation of a synthetic zeolite for detergent builders from acid clay produced in Nakajo, Niigata Prefecture, Japan, as the smectite clay mineral.

The acid clay produced in Nakajo, Niigata Prefecture, Japan, which was used in this Example, contained 45% by weight in the as-produced state, and the metallic oxide composition of the clay (based on the product dried at 110° C.) was as follows:

| | |
|---|---|
| $SiO_2$ | 72.1% by weight |
| $Al_2O_3$ | 14.2% by weight |
| $Fe_2O_3$ | 3.87% by weight |
| MgO | 3.25% by weight |
| CaO | 1.06% by weight |
| Ignition loss | 3.15% by weight |

The starting acid clay was molded into columns having a diameter of 5 mm and a length of 5 to 20 mm, and 1250 Kg (as the dried product) of the molded clay was charged in a lead-lined wood tank having a capacity of 5 m³ and 3300 l of sulfuric acid having a concentration of 47% by weight was added thereto. Then, the temperature was elevated to 90° C. and the acid treatment of the clay granules was carried out for 40 hours. Sulfates of basic components which had reacted with sulfuric acid were removed by decantation using a dilute solution of sulfuric acid and water, and the water washing was conducted until no sulfate ion was detected. Thus, a granular acid-treated product was obtained.

The degree of destruction of the crystal structure of the above granular acid-treated product was determined from the X-ray diffraction peaks. The granular acid-treated product was dried for 2 hours in a drier maintained at 110° C. and the dried product was analyzed. Obtained results are shown in Table 1. This acid-treated product will hereinafter be referred to as "activated silica" (having a water content of 50% by weight) (sample 1-1).

Table 1

| Acid-Treated Product | |
|---|---|
| | Sample 1-1 |
| Composition (% by weight) | |
| Ignition loss | 3.71 |
| $SiO_2$ | 94.26 |
| $Al_2O_3$ | 1.27 |
| $Fe_2O_3$ | 0.39 |
| MgO | 0.30 |
| CaO | 0.07 |
| $SiO_2/Al_2O_3$ Mole Ratio | 126.2 |
| AAI | 38 |
| [001] DC (%) | undetectable |
| [020] DC (%) | 2 |

The above activated silica was wet-pulverized in a ball mill while adding water to adjust the concentration to 20% by weight, to obtain an activated silica slurry (sample 1-2) having a particle size distribution shown in Table 2 (as measured by particle size measurement device Model PSA-2 -manufactured by Hitachi Seisakusho K. K.).

Table 2

| Particle Size Distribution | |
|---|---|
| | Sample 1-2 |
| smaller than 5 $\mu$ | 46.0% |
| 5 to 20 $\mu$ | 54.0% |
| larger than 20 $\mu$ | 0% |

A stainless steel vessel having a capacity of 2 m³ was charged with 79.6 Kg of the slurry (sample 1-2) and 46.6 Kg of a commercially available caustic soda solution (containing 49% of NaOH) was added thereto. The mixture was agitated at 60° C, for 6 hours to obtain an alkali metal polysilicate A having a composition corresponding to $Na_2O·8.8SiO_2$.

For comparison, in the same manner as described above, the same commercially available caustic soda solution was added to the above slurry (sample 1-2) at 20° C. to obtain an alkali metal polysilicate slurry B having a composition corresponding to $Na_2O·8.8SiO_2$, and the slurry was immediately used for the preparation of a synthetic zeolite without aging.

As one of conditions for the preparation of a synthetic zeolite for detergent builders, the following composition (oxide mole ratios) was chosen.

$Na_2O/SiO_2 = 0.9$
$SiO_2/Al_2O_3 = 2.0$
$H_2O/Na_2O = 50.0$
$CA = 1.9\%$

An alkali metal aluminate solution having a composition of 18.54% of $Na_2O$, 19.1% of $Al_2O_3$ and 62.4% of $H_2O$ and an $Na_2O/Al_2O_3$ molar ratio of 1.6/1 was prepared by dissolving commercially available aluminum hydroxide to commercially available caustic soda. This aluminate solution was formed as the alkali metal aluminate solution to be added to the above alkali metal polysilicate A or B so as to attain the above composition (oxide mole ratios).

Process for preparation of synthetic zeolite for detergent builders

Water was added to the alkali metal polysilicate slurry A or B to adjust the $SiO_2$ concentration to 10%, and the mixture was charged in a stainless steel vessel having a capacity of 3.5 m³. A solution formed by adding water to the above alkali metal aluminate solution under agitation at 20° C. to adjust Na₂O and Al₂O₃ concentrations to 12.5% and 12.8%, respectively, was added to the above mixture over a period of about 80 minutes. The mixture was once gelled and it was finally converted to a homogeneous slurry. Then, the mixture was heated at 95° C. and reaction was carried out for 3 hours under agitation to form crystalline particles of a zeolite. Then, the reaction product was washed with water and filtered. The filter cake was recovered and dried in a drier maintained at 110° C. to obtain a synthetic zeolite (sample 1-3 or sample H-1).

The so prepared zeolite sample 1-3 (derived from the alkali metal polysilicate slurry A) and zeolite sample H-1 (derived from the alkali metal polysilicate slurry B) were subjected to various tests according to the test methods described hereinbefore to determine the X-ray diffraction crystal form, the crystallization degree (CR), the calcium ion binding property (CI), the initial buffer capacity (R), the buffer capacity (S), the effective alkali quantity (Qc), the suspension pH, the oil absorption (OA), the bulk density (BD), the primary particle size (Dp), the secondary particle size distribution (Ds), the sedimentation speed (Vs), the Methylene Blue Adsorbing Property (AM) and the surface charge controlling property (ED). Obtained results are shown in Table 3.

In addition to the sample H-1 were prepared by using the non-aged alkali metal polysilicate B, commercially available zeolites A and B (samples H-2 and H-3) were similarly tested as comparative samples. Obtained results are shown in Table 3.

the washing power, the re-contamination preventing effect and the rinsing property were tested according to the methods described below.

An instance of a granular synthetic detergent composition containing the synthetic zeolite obtained in this Example (sample 1-3) is as follows:

| | |
|---|---|
| Linear sodium alkyl benzene-sulfonate | 18 parts by weight |
| Synthetic zeolite builder* | 20 parts by weight |
| Carboxymethylcellulose | 1 part by weight |
| Sodium silicate | 5 parts by weight |
| Sodium carbonate | 3 parts by weight |
| Sodium sulfate | 42 parts by weight |

Details of chemicals used for the above composition and the tests described below are as follows:

(1) Linear sodium alkyl benzene-sulfonate having a molecular weight of 345 ± 5, a purity higher than 50%, an unreacted oil content (starting alkyl benzene content) lower than 1%, a sodium sulfate content lower than 2% and a water content lower than 2%.

(2) Sodium tripolyphosphate specified in JIS K-1465.

(3) Sodium silicate used was sodium silicate No. 2 specified in JIS K-1408.

(4) Sodium carbonate (anhydride) (reagent grade) specified in JIS K-8625.

(5) Carboxymethylcellulose having a substitution degree (etherification degree) of 0.5 to 0.6, a purity higher than 95% (as the anhydride), a sodium chloride content lower than 5% (as the anhydride) and a water content lower than 10%.

(6) Sodium sulfate (anhydride) (reagent grade) specified by JIS K-8987.

Table 2
Properties of Synthetic Zeolites

| Item | Sample 1-3 | Sample H-1 | Sample H-2 | Sample H-3 |
|---|---|---|---|---|
| Crystal Form | A | A | A | A |
| Crystallization Degree (C.R) | 72 | 68.1 | 79.1 | 80.5 |
| Calcium Ion Binding Property (C.I) | 145 | 140 | 121 | 110 |
| Initial Buffer Capacity (R) | 39.6 | 38.2 | 38.6 | 26.4 |
| Buffer Capacity (S) | 177 | 125 | 128 | 69.1 |
| Effective Alkali Quantity (Qc) | 3.96 | 3.9 | 3.2 | 1.9 |
| Suspension pH | 10.7 | 10.9 | 10.6 | 10.4 |
| Oil Absorption (O.A) | 58 | 44 | 41 | 42 |
| Bulk Density (B.D) | 0.38 | 0.49 | 0.57 | 0.7 |
| Primary Particle Size (Dp) (μ) | 0.4 | 1.1 | 2 | 3 |
| Secondary Particle Size Distribution (Ds) (% by weight) | | | | |
| 0 - 3 μ | 100 | 50.1 | 0.1 | 1.5 |
| 3 - 4 μ | — | 27.3 | 0.2 | 3.0 |
| 4 μ - | — | 22.6 | 99.7 | 95.5 |
| Sedimentation Speed (Vs) (cm/hr) | 0.6 | 7.1 | 9.4 | 37.4 |
| Methylene Blue Adsorbing Property (A.M) | 5 | 5 | 5 | 5 |
| Surface Charge Controlling Property (ED) | 5 | 4 | 4 | 4 |

The chemical composition of the synthetic zeolite prepared in this Example (sample 1-3) is shown in Table 4.

Table 4
Chemical Composition of Synthetic Zeolite (Sample 1-3)

| | |
|---|---|
| Ignition Loss | 17.34 % by weight |
| SiO₂ | 35.46 % by weight |
| Al₂O₃ | 30.46 % by weight |
| Fe₂O₃ | 0.04 % by weight |
| CaO | 0.11 % by weight |
| MgO | 0.04 % by weight |
| Na₂O | 16.55 % by weight |
| Total | 100.00 % by weight |

The synthetic zeolite obtained in this Example was incorporated into a synthetic detergent, and an artificially contaminated cloth or the like was washed and (7) Calcium chloride (anhydride) (reagent grade) specified by JIS K-8122.

The above components were precisely measured and kneaded sufficiently in a mortar by using a pestle, and the mixture was transferred into a porcelein dish and dried in a drier maintained at 105° ± 2° C. until the mixture was substantially powdered. Then, the mixture was treated in a mortar by using a pestle and the particle size was reduced so that the resulting powder was completely passed through a 350-μ standard sieve (specified in JIS Z-8801). Then, the resulting powdered product was stored in a desiccator.

Detergent compositions were similarly prepared by using comparative samples H-1, H-2 and H-3 instead of the synthetic zeolite asterisked above.

The water content of the resulting granular detergent was measured according to the method specified in JIS K-3362, 5-17-2, and 1.4 g as calculated as the anhydrous detergent of the sample was precisely measured and dissolved in 1 l of washing water (formed by weighing 135 mg of calcium chloride precisely to the unit of mg and dissolving it into water so that the entire volume was 1 l). solution was used as the detergent solution and subjected to the following tests to determine the washing power, re-contamination preventing effect, rinsing property and suspension stability.

A standard detergent for evaluation of the washing power was prepared in the following manner:

Components indicated below were precisely weighed and kneaded sufficiently by using a mortar and a pestle, and mixture was transferred into a porcelein dish and dried in a drier maintained at 105 ± 2° C. until the mixture was substantially powdered. The mixture was treated in a mortar by using a pestle and the particle size was reduced so that the resulting powder was completely passed through a 350-μ standard sieve. The resulting powdered product was stored in a desiccator and used as the standard detergent for determination of the washing power.

Components of the standard detergent for determination of washing power:

| | |
|---|---|
| Linear sodium alkyl benzenesulfonate | 30 parts by weight |
| Sodium tripolyphosphate | 17 parts by weight |
| Sodium silicate | 10 parts by weight |
| Sodium carbonate | 3 parts by weight |
| Carboxymethylcellulose | 1 part by weight |
| Sodium sulfate | 58 parts by weight |

1. Measurement of Washing Power (a) Test Cloth

Cotton cloth (white cloth for the dye color fastness test) specified in JIS L-0803.

(b) Contaminated Cloth

The test cloth was cut into pieces having a size of 11 cm × 13 cm, and 2 cloth pieces were joined by stitching short sides of the cloth pieces with a stitching overlap width of 1 cm in each cloth piece so that the weaving directions of both the cloth pieces were in agreement with each other. Thus, a neckband (11 cm × 24 cm) was prepared.

The so prepared neckband was fixed to a collar of a shirt or other garment by buttons or an adhesive tape so that the neckband covered the collar fold. This shirt or garment was worn for 7 days. The resulting soiled neckband was used for the washing test as the contaminated cloth.

(c) Washing Test

Among soiled neckbands taken out of the shirts or garments, those soiled equally on both the sides with the seam being as the center were chosen, and they were divided into three groups depending on the degree of contamination, namely remarkably contaminated, moderately contaminated and slightly contaminated groups. Five soiled neckbands were chosen from each group, and 15 soiled neckbands were tested as one set of soiled neckbands with respect to each detergent sample. Threads were removed from the soiled neckbands. One set of 15 soiled unsewn neckband pieces were dipped in 1 l of a washing solution of the standard detergent maintained at 30° C. and another set of 15 soiled unsewn neckband pieces were dipped in 1 l of a washing solution of the sample detergent. Washing was carried out for 10 minutes by using a agitation type washing power tester (rotation speed = 120 rpm). The washed cloth pieces were lightly squeezed by hands so that the water content was below 200%. Then, the cloth pieces were rinsed with 1 l of a rinsing liquor of 30° C. which had been prepared in advance by weighing 135 mg of calcium chloride precisely to the unit of mg and dissolving it into water so that the volume was 1 l) by using the same agitation type washing power tester (rotation speed = 120 rpm). The rinsing was continued for 3 minutes. This rinsing operation was conducted two times.

The washed cloth pieces were air-dried and every two corresponding cloth pieces were joined by stitching the short sides in the same manner as described above. The resulting washed neckbands were ironed and used as specimens for evaluation of the washing power.

(d) Evauation of Washing Power (1) Evaluation method

On white paper were arranged 15 washed neckbands in the order of signs, and according to the method for comparison of surface colors specified in JIS Z-8723 6, every washed neckband was compared with the companion neckband washed by the standard detergent. In this manner, the washing power of the sample detergent was compared with that of the standard detergent with respect to each specimen neckband with the naked eye. The evaluation was performed by 3 experts.

(2) Evaluation standard

The degree of the washing effect by the sample detergent was evaluated according to the following scale based on the degree of the washing effect by the standard detergent:

− 2: apparently inferior
− 1: slightly inferior
0: no substantial difference
+ 1: slightly superior
+ 2: apparently superior

2. Test of Re-Contamination Preventing Effect at Washing (1) Washing Method

By using the sample detergents, 10 white cotton cloths mentioned above and 10 artifically contaminated cloths were washed in the following manner:

A beaker having a capacity of 2000 ml was charged with 1000 ml of a washing liquor formed by dissolving the sample detergent into water having a hardness of 5° DH so that the detergent concentration was 0.14%. Then, the above 10 white cloths and 10 contaminated cloths were immersed in the washing liquor. Washing was conducted at 30° C. for 10 minutes at a rotation number of 120 rpm.

Then, the washed cloths were rinsed with 1000 ml of water having a hardness of 5° DH at 30° C. for 10 minutes at a rotation speed of 120 rpm. This rinsing operation was conducted twice. The rinsed cloths were air-dried and ironed, and they were used as specimens for evaluation of the re-contamination preventing effect.

(2) Evaluation Method

White cloths were presented to a panel of 20 mens before and after the above washing test, and contamination was examined with the naked eye and evaluated according to a 5-staged scale, in which "5" indicates no contamination (same as the white cloth before washing) and "1" indicates the same contamination degree as that of the artificially contaminate cloth. Accordingly, a value closer to 5 indicates a higher re-contamination preventing effect.

3. Test of Rinsing Property

A glass beaker having a diameter of about 107 mm, a height of 148 mm and a capacity of 1 liter was charged with 1 l of warm water maintained at 30° ± 2° C., and 2.5 g of the sample detergent was dispersed. Then, 5 black cotton muslin cloths having a size of 10 cm × 10 cm were put into the dispersion and agitated for 10 minutes at a rotation speed of 200 rpm by using a jar tester. Then, the cloths were taken out from the dispersion, immersed in 500 ml of another warm water maintained at 30° ± 2° C. and agitated for 3 minutes at a rotation speed of 200 rpm.

Then, the degree of adhesion of the detergent powder to the black cotton muslin cloths was examined and evaluated with the naked eye by a panel of 20 mens according to a 5-staged scale, in which "1" indicates the largest adhesion of the detergent powder and "5" indictes no adhesion (same state as in the black cotton cloth before the test). Namely, a value closer to 5 indicates less adhesion of the detergent poder after rinsing and a better rinsing property.

4. Measurement of Suspension Stability

A beaker was charged with 1000 ml of deionized water maintained at 20° ± 2° C. and 1.5 g of the sample detergent was added thereto. The mixture was agitated at 120 rpm for 5 minutes by a jar tester to disperse the detergent in water. Immediately, the suspension was quickly flown into a graduated cylinder having a height of 22.5 cm and a diameter of 2.6 cm so that the suspension reached a scale mark of 100 ml (the height of the scale mark from the bottom being 18.7 cm). The suspension was allowed to stand still for 30 minutes, and the height (cm) of the layer of the supernatant was measured and multiplied by 2. The suspension stability was expressed in terms of the thus obtained value (cm/hr). Accordingly, a lower value indicates a higher suspension stability.

5. Measurement of Powder Falling Property

Test cloths were washed according to the same washing method as described above with respect to the measurement of the washing power. This washing operation was conducted 5 times. Then, the test cloths were rinsed, air-dried and ironed. For this test, 15 test cloths were used for each sample detergent.

The fifteen test cloths were rubbed by hands on black paper so that white fine particles adhering to surfaces, seams and other parts of the test cloths were caused to fall on the black paper. The degree of powder falling was examined with the naked eye. The evaluation was performed by 3 experts.

The powder falling property was evaluated according to the following scale based on the powder falling property of the above-mentioned standard detergent:

− 2: apparently inferior
− 1: slightly inferior
0: no substantial difference
+ 1: slightly superior
+ 2: apparently superior Results of the foregoing tests made on the detergent containing the synthetic zeolite of Example 1 and the above-mentioned comparative zeolites are shown in Table 5.

Table 5

|  | Detergent Sample 1-4 | Detergent Sample 1-5 | Detergent Sample 1-6 | Detergent Sample 1-7 |
|---|---|---|---|---|
| Zeolite builder used | 1-3 | H-1 | H-2 | H-3 |
| Washing power | + 2 | − 1 | − 2 | − 2 |
| Re-contamination preventing effect | 5 | 4 | 3 | 2 |
| Rinsing property | 4.6 | 3 | 1.4 | 1.2 |
| Suspension stability | 0.3 | 6 | 14 | 18 |
| Powder falling property | + 2 | − 1 | − 2 | − 2 |

From the results shown in Table 5, it will readily be understood that the synthetic zeolite having a primary particle size of 0.4 μ, a secondary particle size distribution range of 0 to 3 μ, a buffer capacity (S) of 177 ml/100 g, a crystallization degree of 72% and a calcium ion binding property of 145 mg/g, which was prepared in Example 1 according to this invention, is very effective as a detergent builder.

EXAMPLE 2

This Example illustrates influences of the amount of the alkali metal hydroxide that is used for the pre-treatment of activated silica.

The activated silica slurry sample 1-2 prepared in Example 1 by acid-treating the clay mineral was treated with sodium hydroxide of grade 1 in the following manner.

Each of 10 glass beakers having a capacity of 1 liter was charged with 600 g of the activated silica slurry sample 1-2 obtained in Example 1. Sodium hydroxide (NaOH) was added into 9 beakers in amounts of 160 g, 54 g, 40 g, 32 g, 23 g, 16 g, 11 g, 8 g and 0.33 g, respectively, while no sodium hydroxide was added to the remaining one beaker. The treatment was conducted at 90° C. under agitation to form alkali metal polysilicate compositions in which the $Na_2O/SiO_2$ molar ratios were 1/1, ⅓, ¼, 1/5, 1/7, 1/10, 1/15, 1/20 and 1/500, respectively.

The alkali metal polysilicate composition in which the $Na_2O/SiO_2$ molar ratio was 1/1 was kept substantially in the solution state.

The activated silica slurry (no sodium hydroxide was added) and the so formed alkali metal polysilicate compositions were mixed with a solution of sodium aluminate (having an $Al_2O_3$ concentration of 19.09% and an $Na_2O$ concentration of 22.49%) and sodium hydroxide to form gelatinous slurries of sodium aluminosilicate. In each run, the composition was adjusted so that the $SiO_2/Al_2O_3$ molar ratio was 2.0 and the CA value was 1.62 mole %. Each slurry was reacted under heating at 90° C. for 6 hours to crystallize out a synthetic zeolite.

There were thus obtained the following synthetic zeolites; namely sample H-4 (no sodium hydroxide was added), sample H-5 (the $Na_2O/SiO_2$ molar ratio at the pre-treatment was 1/1), sample 2-1 (the $Na_2O/SiO_2$ molar ratio at the pre-treatment was ½) and samples 2-2, 2-3, 2-4, 2-5, 2-6, 2-7 and 2-8 (the $Na_2O/SiO_2$ molar ratios at the pre-treatment were ¼, 1/5, 1/7, 1/10, 1/15, 1/20 and 1/500, respectively).

Properties of the so obtained synthetic zeolites were determined in the same manner as described in Example 1 to obtain results shown in Table 6.

mill. Then, sodium aluminate was added to the resulting alkali metal polysilicate slurry so that the $Na_2O/SiO_2$ molar ratio was 1.0, the $SiO_2/Al_2O_3$ molar ratio was 2.0 and the $H_2O/Na_2O$ molar ratio was 60. The resulting gelatinous slurry of sodium aluminosilicate was heated at 90° C. to effect crystallization and obtain a synthetic zeolite (sample 3-2).

Physical properties of these zeolite samples 3-1 and 3-2 were determined in the same manner as described in Table 6

| Item | Sample H-4 | Sample H-5 | Sample 2-1 | Sample 2-2 | Sample 2-3 | Sample 2-4 | Sample 2-5 | Sample 2-6 | Sample 2-7 | Sample 2-8 |
|---|---|---|---|---|---|---|---|---|---|---|
| Crystal Form | A | A | A | A | A | A | A | A | A | A |
| Crystallization Degree (CR) | 68 | 75 | 74 | 73 | 71 | 72 | 72 | 71 | 71 | 68 |
| Calcium Ion Binding Property (CI) | 120.0 | 135.4 | 135.4 | 135.4 | 135.4 | 138.2 | 140.9 | 140.9 | 140.9 | 138.1 |
| Initial Buffer Capacity (R) | 42.0 | 44.9 | 42.2 | 42.2 | 42.2 | 42.2 | 42.2 | 39.6 | 42.2 | 55.1 |
| Buffer Capacity (S) | 120 | 119 | 142 | 139 | 147 | 143 | 153 | 143 | 161 | 136.5 |
| Effective Alkali Quantity (Qc) | 2.60 | 2.57 | 2.83 | 2.85 | 3.08 | 3.33 | 3.50 | 3.46 | 3.59 | 3.02 |
| Suspension pH | 10.2 | 10.2 | 10.3 | 10.3 | 10.5 | 10.6 | 10.6 | 10.6 | 10.6 | 10.1 |
| Oil Absorption (OA) | 43.0 | 42.0 | 47.0 | 47.0 | 48.7 | 55.0 | 58.8 | 59.5 | 60.5 | 63.5 |
| Bulk Density (BD) | 0.54 | 0.56 | 0.54 | 0.51 | 0.50 | 0.50 | 0.42 | 0.38 | 0.38 | 0.40 |
| Primary Particle Size (Dp)(μ) | 1.1 | 2.3 | 1 | 0.9 | 0.8 | 0.8 | 0.5 | 0.4 | 0.4 | 0.6 |
| Secondary Particle Size Distribution (Ds) (% by weight) | | | | | | | | | | |
| 0–3 μ | 24.2 | 29.8 | 56.8 | 84.4 | 87.3 | 94.2 | 95.1 | 98.2 | 100.0 | 56.4 |
| 3–4 μ | 45.5 | 25.1 | 20.0 | 15.6 | 12.7 | 5.8 | 4.9 | 1.8 | — | 43.6 |
| 4 μ | 30.3 | 45.1 | 23.2 | — | — | — | — | — | — | — |
| Sedimentation Speed (Vs) | 4.3 | 5.0 | 3.5 | 1.8 | 1.6 | 0.8 | 0.4 | 0.3 | 0.3 | 0.9 |
| Methylene Blue Adsorbing Property (AM) | 5 | 5 | 5 | 5 | 5 | 5 | 5 | 5 | 5 | 5 |
| Surface Charge Controlling Property (ED) | 5 | 5 | 5 | 5 | 5 | 5 | 5 | 5 | 5 | 5 |

Detergents were prepared by using the above synthetic zeolites in the same manner as described in Example 1, and the washing power, re-contamination preventing effect, rinsing property, suspension stability and powder falling property were tested in the same manner as described in Example 1 to obtain results shown in Table 7.

Example 1 to obtain results shown in Table 8.

Table 8

| Item | Sample 3-1 | Sample 3-2 |
|---|---|---|
| Crystal Form | A | A |
| Crystallization Degree (CR) | 69.9 | 70 |
| Calcium Ion Binding Property (CI) | 143 | 135 |
| Initial Buffer Capacity (R) | 41.8 | 40.1 |

Table 7

| | Sample 2-9 | Sample 2-10 | Sample 2-11 | Sample 2-12 | Sample 2-13 | Sample 2-14 | Sample 2-15 | Sample 2-16 | Sample 2-17 | Sample 2-18 |
|---|---|---|---|---|---|---|---|---|---|---|
| Sample Number of Zeolite Builder Used | H-4 | H-5 | 2-1 | 2-2 | 2-3 | 2-4 | 2-5 | 2-6 | 2-7 | 2-8 |
| Washing Power | −1 | −2 | +0 | +1 | +2 | +2 | +2 | +2 | +1 | +0 |
| Re-Contamination Preventing Effect | 3 | 3 | 3.5 | 4 | 4.9 | 5 | 5 | 5 | 5 | 5 |
| Rinsing Property | 2 | 1.2 | 3 | 3.5 | 4.5 | 4.5 | 4.6 | 4.6 | 4.6 | 4.5 |
| Suspension Stability | 0.4 | 0.8 | 0.6 | 0.4 | 0.4 | 0.3 | 0.2 | 0.2 | 0.2 | 0.3 |
| Powder Falling Property | −1 | −2 | +0 | +1 | +2 | +2 | +2 | +2 | +1 | +0 |

EXAMPLE 3

This Example illustrates influences of conditions of the pre-treatment of activated silica.

(A) To 600 g of the activated silica slurry sample 1-2 prepared in Example 1 was added 7.6 g of sodium hydroxide so that the $Na_2O/SiO_2$ molar ratio was 1/21. The mixture was aged under agitation for 15 hours at 20° ± 2° C. to form an alkali metal polysilicate slurry. Then, sodium aluminate was added to the slurry so that the $Na_2O/SiO_2$ molar ratio was 1.0, the $SiO_2/Al_2O_3$ molar ratio was 2.0 and the $H_2O/Na_2O$ molar ratio was 60. Then, the resulting gelatinous slurry of sodium aluminosilicate was heated at 90° C. to effect crystallization and obtain a synthetic zeolite (sample 3-1).

(B) To 100 g of the activated silica sample 1-1 (having a water content of 50%) described in Example 1 was added 3.2 g of sodiium hydroxide so that the $Na_2O/SiO_2$ molar ratio was 1/21. The mixture was sufficiently kneaded in a mortar and dried in a drier maintained at 110° C. Then, water was added to the resulting alkali metal polysilicate so that the $SiO_2$ concentration was 10% by weight, and the mixture was pulverized in a ball

| | | |
|---|---|---|
| Buffer Capacity (S) | 176.8 | 158 |
| Effective Alkali Quantity (Qc) | 3.97 | 3.77 |
| Suspension pH | 10.6 | 10.6 |
| Oil Absorption (OA) | 59.0 | 50 |
| Bulk Density (BD) | 0.395 | 0.42 |
| Primary Particle Size (Dp) (μ) | 0.4 | 0.7 |
| Secondary Particle Size Distribution (Ds) (% by weight) | | |
| 0 – 3 μ | 100 | 88 |
| 3 – 4 μ | — | 12 |
| 4 μ – | — | — |
| Sedimentation Speed (Vs) | 0.6 | 0.7 |
| Methylene Blue Adsorbing Property (AM) | 5 | 5 |
| Surface Charge Controlling Property (ED) | 5 | 5 |

Detergents were prepared by using the above synthetic zeolite samples 3-1 and 3-2 in the same manner as described in Example 1, and the washing power, re-contamination preventing effect, rinsing property, suspension stability and powder falling property were determined in the same manner as described in Example 1 to obtain results shown in Table 9.

Table 9

|  | Sample 3-3 | Sample 3-4 |
|---|---|---|
| Sample Number of Zeolite Used | 3-1 | 3-2 |
| Washing Power | +2 | +2 |
| Re-Contamination Preventing Effect | 5 | 5 |
| Rinsing Property | 4.6 | 4.6 |
| Suspension Stability | 0.3 | 0.4 |
| Powder Falling Property | +2 | +2 |

EXAMPLE 4

This Example illustrates an embodiment comprising drying and pulverizing activated silica obtained by acid-treatment of the clay, adding water to the resulting powder of activated silica to form a slurry, adding a commercially available sodium silicate solution No. 3 to the slurry to effect the pre-treatment, adding a solution of sodium aluminate to the resulting sodium polysilicate and crystallizing out a zeolite.

The sodium silicate solution No. 3 was mixed with the activated silica slurry sample 1-2 prepared in Example 1 so that the $Na_2O/SiO_2$ molar ratio in the resulting composition was ¼, 1/6, ⅛, 1/10, 1/15, 1/20 or 1/500.

Then, a sodium aluminate solution having an $Al_2O_3$ concentration of 19.09% and an $Na_2O$ concentration of 22.49% was added together with water and sodium hydroxide to the above alkali polysilicate composition so that the $Na_2O/SiO_2$ molar ratio was 1.32, the $SiO_2/Al_2O_3$ molar ratio was 1.94 and the $H_2O/Na_2O$ molar ratio was 61.8. The resulting gelatinous slurry of sodium aluminosilicate was heated and reacted at 90° C. for 6 hours to crystallize out a synthetic zeolite.

There were thus obtained synthetic zeolites; namely, sample 4-1 (the $Na_2O/SiO_2$ molar ratio was ¼ in the alkali polysilicate composition) and samples 4-2, 4-3, 4-4, 4-5, 4-6 and 4-7 (the $Na_2O/SiO_2$ molar ratios in the alkali polysilicate compositions were 1/6, ⅛, 1/10, 1/15, 1/20 and 1/500, respectively).

For comparison, in the same manner as described above, the above sodium aluminate solution was added to the sodium silicate solution No. 3 and a synthetic zeolite (sample H-6) was prepared from the resulting sodium aluminosilicate gelatinuous slurry.

Another comparative zeolite builder (sample H-7) was prepared according to the teaching of Japanese Patent Application Laid-Open Specification No. 12381/75 in the following manner:

Powder of activated silica was added to the sodium silicate solution No. 3 to form sodium silicate having a composition coresponding to $Na_2O \cdot 6SiO_2$, and the sodium silicate was added together with water and sodium hydroxide to sodium aluminate so that the $Na_2O/SiO_2$ mole ratio was 1.32, the $SiO_2/Al_2O_3$ molar ratio was 1.94 and the $H_2O/Na_2O$ molar ratio was 61.8 in the resulting sodium aluminosilicate gel. Then, the mixture was agitated and blended at a rotation speed of 10000 to 12000 rpm by using an agitating mixer (Model VA-853 manufactured by Hitachi Seisakusho K. K.) The resulting sodium aluminosilicate gel slurry was heated and reacted at 80° C. for 24 hours under agitation to form a synthetic zeolite (sample H-7).

Properties of these zeolites were determined in the same manner as described in Example 1 to obtain results shown in Table 10.

Table 10

| Item | Sample H-6 | Sample H-7 | Sample 4-1 | Sample 4-2 | Sample 4-3 | Sample 4-4 | Sample 4-5 | Sample 4-6 | Sample 4-7 |
|---|---|---|---|---|---|---|---|---|---|
| Crystal Form | A | A | A | A | A | A | A | A | A |
| Crystallization Degree (CR) | 78 | 80 | 74 | 71 | 70 | 68 | 65 | 65 | 62 |
| Calcium Ion Binding Property (CI) | 133 | 110 | 136 | 140 | 142 | 143 | 136 | 135 | 128 |
| Initial Buffer Capacity (R) | 34.0 | 23.6 | 39.6 | 37 | 38 | 38.1 | 38 | 37 | 37 |
| Buffer Capacity (S) | 116.1 | 68.3 | 154.1 | 150.4 | 150.0 | 148.1 | 150.1 | 148 | 146 |
| Effective Alkali Quantity (Qc) | 2.5 | 1.3 | 3.8 | 3.8 | 3.78 | 3.78 | 3.8 | 3.8 | 3.71 |
| Suspension pH | 10.3 | 9.5 | 10.5 | 10.4 | 10.4 | 10.4 | 10.4 | 10.5 | 10.4 |
| Oil Absorption (OA) | 43.1 | 35.5 | 50.5 | 50.1 | 50.1 | 55.1 | 55.0 | 56.0 | 54.5 |
| Bulk Density (BD) | 0.51 | 0.62 | 0.479 | 0.48 | 0.39 | 0.38 | 0.38 | 0.39 | 0.4 |
| Primary Particle Size (Dp) (μ) | 2.1 | 5.4 | 1.0 | 1.0 | 0.8 | 0.6 | 0.6 | 0.7 | 1.0 |
| Secondary Particle Size Distribution (Ds) (% by weight) | | | | | | | | | |
| 0 – 3 μ | 12.3 | 0.5 | 48 | 63 | 100 | 100 | 100 | 100 | 84 |
| 3 – 4 μ | 26.6 | 6.3 | 52 | 37 | — | — | — | — | 16 |
| 4 μ – | 61.1 | 93.2 | — | — | — | — | — | — | — |
| Sedimentation Speed (Vs) | 15 | 37.4 | 9 | 9 | 1.8 | 0.8 | 0.8 | 0.8 | 8 |
| Methylene Blue Adsorbing Property (AM) | 5 | 5 | 5 | 5 | 5 | 5 | 5 | 5 | 5 |
| Surface Charge Controlling Property (ED) | 4 | 3 | 5 | 5 | 5 | 5 | 5 | 5 | 5 |

Detergents were prepared by using the above synthetic zeolites in the same manner as described in Example 1, and the washing power, re-contamination preventing effect, rinsing property, suspension stability and powder falling property of these detergents were determined in the same manner as described in Example 1 to obtain results shown in Table 11.

Table 11

|  | Sample 4-8 | Sample 4-9 | Sample 4-10 | Sample 4-11 | Sample 4-12 | Sample 4-13 | Sample 4-14 | Sample 4-15 | Sample 4-16 |
|---|---|---|---|---|---|---|---|---|---|
| Sample Number of Zeolite Used | H-6 | H-7 | 4-1 | 4-2 | 4-3 | 4-4 | 4-5 | 4-6 | 4-7 |
| Washing Power | −2 | −2 | +0 | +0 | +1 | +1 | +2 | +2 | +1 |
| Re-Contamination Preventing Effect | 3 | 1 | 4 | 4 | 5 | 5 | 5 | 5 | 5 |
| Rinsing Property | 1.2 | 1 | 3.5 | 4.0 | 4.6 | 4.6 | 4.6 | 4.6 | 4.0 |
| Suspension Stability | 15 | 37.4 | 5 | 0.5 | 0.2 | 0.2 | 0.2 | 0.3 | 0.4 |
| Powder Falling Property | −2 | −2 | +0 | +0 | +1 | +1 | +2 | +2 | +1 |

EXAMPLE 5

In this Example, the same acid clay as used in Example 1, that was produced in Nakajo, Niigata Prefecture, Japan, was treated with sulfuric acid under various conditions.

The starting acid clay was molded in columns having a diameter of 5 mm and a length of 5 to 20 mm, and 76.5 g each of the molded clay as calculated as the dried product was charged into four conical beakers having a capacity of 500 ml. Then, 200 ml of sulfuric acid having a concentration of 50% by weight was added to each beaker. Then, the granular clay was acid-treated at 90° C. for 2, 8, 20 or 30 hours. Sulfates of basic components that had reacted with sulfuric acid were washed away and removed by decantation using dilute sulfuric acid and water. The recovered acid-treated clay was washed with water until sulfate ion was not detected at all. Thus, thre were obtained 4acid-treated clays. The starting acid clay was designated as sample 5-1, and products acid-treated for 2, 8, 20 and 30 hours were designates as samples 5-2, 5-3, 5-4 and 5-5, respectively.

These samples 5-1 to 5-5 were subjected to the X-ray diffraction analysis and the degrees of destruction of crystal structures (DC, %) were determined from the diffraction peaks. Further, each sample was subjected to the chemical analysis. Obtained results are shown in Table 12.

Then, 200 g each of samples 5-1 to 5-5 were charged into 1-liter capacity beakers, respectively, and 3 g, 3.2 g, 3.6 g, 4 g and 4 g of sodium hydroxide were added to samples 5-1 to 5-5, respectively. Each mixture was aged at 60° C. under agitation for 2 hours to obtain an alkali metal polysilicate slurry.

As one of conditions for the synthesis of a synthetic zeolite, the following composition expressed in terms of oxide molar ratios was chosen:

$Na_2SiO_2 = 1.0$
$SiO_2/Al_2O_3 = 2.0$
$H_2/Na_2O = 60$

In order to attain the above molar ratios, necessary amounts of an alumina component and alkali metal and water components for the reaction were added to the above slurries of the acid-treated clays (the contents of $SiO_2$ and $Al_2O_3$ differed depending on the acid treatment conditions). More specifically, a commercially available Table 12

|  | Sample 5-1 | Sample 5-2 | Sample 5-3 | Sample 5-4 | Sample 5-5 |
| --- | --- | --- | --- | --- | --- |
| Acid Treatment Time (hours) | 0(untreated) | 2 | 8 | 20 | 30 |
| X-Ray Diffraction Pattern | FIG. 8 | FIG. 9 | FIG. 10 | FIG. 11 | — |
| Composition (% by weight) |  |  |  |  |  |
| ignition loss | 5.27 | 5.5 | 5.6 | 3.11 | 3.60 |
| $SiO_2$ | 72.1 | 76.22 | 84.2 | 94.10 | 94.21 |
| $Al_2O_3$ | 14.23 | 11.3 | 7.1 | 1.67 | 1.30 |
| $Fe_2O_3$ | 3.87 | 3.18 | 1.4 | 0.46 | 0.43 |
| MgO | 3.47 | 2.8 | 1.2 | 0.31 | 0.31 |
| CaO | 1.06 | 1.0 | 0.5 | 0.07 | 0.15 |
| $SiO_2/Al_2O_3$ Molar Ratio | 8.6 | 11.47 | 20.2 | 95.8 | 123.2 |
| AAI | 8 | 16 | 39 | 37 | 37· |
| [001] DC (%) | 100 | 18 | undetectable | undetectable | undetectable |
| [020] DC (%) | 100 | 80 | 15 | 5 | 3 |

The above granular acid-treated products were treated in order to attain a particle size distribution suitable for the production of an alkali polysilicate for the synthesis of a zeolite builder. More specifically, the untreated starting clay or acid-treated product was put into a household mixer (Mode VA-853 manufactured by Hitachi Seisakusho K. K.) and water was added thereto so that the solid concentration was 20% by weight, and the mixture was agitated and pulverized for 40 minutes and sieved by using a 270-Typer mesh sieve. Thus, a slurry of the untreated starting clay or acid-treated product having the particle size thus adjusted was obtained. The particle size distribution (% by weight) was determined to obtain results shown in Table 13. With respect to sample 5-4 as a typical instance, the secondary particle size distribution (Ds) was examined more detailedly to obtain results shown in Table 14.

sodium aluminate solution (having an $Na_2O$ content of 21.0% and an $Al_2O_3$ content of 18.8%) was mixed with commercially available caustic soda (NaOH) and water so that the above composition was attained, and the mixture was filtered to obtain a purified liquid mixture. The acid-treated clay slurry and the resulting liquid mixture were charged in a beaker having a capacity of 2 liters so that the amount of the reaction mixture was about 1.5 liters. The mixture was agitated at 20° C., whereby the mixture once passed through a gelled state and was then converted to a homogeneous slurry. The temperature was elevated to 95° C. and the mixture was agitated for 3 hours to effect reaction and form crystalline particles of a zeolite. The reaction mixture was filtered by a suction filter and washed with deionized water. The filter cake recovered was dried in a drier maintained at 100° C. Thus, there were obtained 5 synthetic zeolites, samples H-8, H-9, 5-6, 5-7 and 5-8, from the above samples 5-1 to 5-5, respectively.

Properties of the so obtained zeolites were determined in the same manner as described in Example 1 to obtain results shown in Table 15.

Table 13

| Particle Size Distribution (% by weight) | Sample 5-1 | Sample 5-2 | Sample 5-3 | Sample 5-4 | Sample 5-5 |
| --- | --- | --- | --- | --- | --- |
| 0 - 5 μ | 65.4 | 65.1 | 64.8 | 65.0 | 64.9 |
| 5 - 20 μ | 34.6 | 34.9 | 35.2 | 35.0 | 35.1 |
| above 20 μ | 0 | 0 | 0 | 0 | 0 |

Table 14

| Secondary Particle Size Distribution (Ds) (% by weight) | 0-1 μ | 1-2 μ | 2-3 μ | 3-4 μ | 4-5 μ | 5-6 μ | 6-7 μ | 7-8 μ | 8-9 μ | 9-10 μ |
| --- | --- | --- | --- | --- | --- | --- | --- | --- | --- | --- |
| Sample 5-4 | 4.6 | 10.3 | 19.2 | 20.1 | 10.8 | 10.5 | 9.8 | 7.5 | 7.2 | 0 |

Table 15

| Item | Sample H-8 | Sample H-9 | Sample 5-6 | Sample 5-7 | Sample 5-8 |
|---|---|---|---|---|---|
| Crystal Form | A | A + Na | A | A | A |
| Crystallization Degree (CR) | | | 67 | 72 | 73 |
| Calcium Ion Binding Property (CI) | 62 | 81 | 116 | 142 | 142 |
| Initial Buffer Capacity (R) | 34 | 42 | 55 | 39 | 42 |
| Buffer (S) | 109 | 115 | 180 | 178 | 179 |
| Effective Alkali Quantity (Qc) | 4.1 | 4.0 | 3.8 | 3.6 | 3.6 |
| Suspension pH | 11.0 | 10.8 | 10.6 | 10.7 | 10.7 |
| Oil Absorption (OA) | 38 | 40 | 49 | 58 | 58 |
| Bulk Density (BD) | 0.53 | 0.51 | 0.42 | 0.38 | 0.39 |
| Primary Particle Size (Dp)($\mu$) | 2.0 | 1.5 | 0.6 | 0.4 | 0.3 |
| Secondary Particle Size Distribution (Ds) (% by weight) | | | | | |
| 0 – 3 $\mu$ | 75 | 87 | 96 | 98 | 100 |
| 3 – 4 $\mu$ | 12 | 9 | 4 | 2 | — |
| 4 $\mu$ – | 13 | 4 | — | — | — |
| Sedimentation Speed (Vs) | 30.1 | 25.0 | 1.0 | 0.6 | 0.5 |
| Methylene Blue Adsorbing Property (AM) | 4 | 5 | 5 | 5 | 5 |
| Surface Charge Controlling Property (ED) | 4 | 4 | 5 | 5 | 5 |

Detergents were prepared by using the above zeolites in the same manner as described in Example 1, and properties of the resulting detergents were tested in the same manner as described in Example 1 to obtain results shown in Table 16.

Table 16

| | Sample 5-9 | Sample 5-10 | Sample 5-11 | Sample 5-12 | Sample 5-13 |
|---|---|---|---|---|---|
| Sample Number of Zeolite Used | H-8 | H-9 | 5-6 | 5-7 | 5-8 |
| Washing Power | −2 | −2 | +2 | +2 | +2 |
| Re-Contamination Preventing Effect | 3 | 3 | 5 | 5 | 5 |
| Rinsing Property | 2 | 3.5 | 4.5 | 4.5 | 4.5 |
| Suspension Stability | 15 | 13 | 0.3 | 0.3 | 0.3 |
| Powder Falling Property | −2 | −2 | +2 | +2 | +2 |

EXAMPLE 6

In this Example, as the starting smectite clay there were chosen (1) sub-bentonite produced in Tsugawa, Niigata Prefecture, Japan, (2) white clay produced in Sanko, Niigata Prefecture, Japan and (3) sub-bentonite produced in chito, USA, they were acid-treated and synthetic zeolites were prepared from slurries of fine particles of the acid-treated clays.

To 500 g of the starting clay was added 9500 g of water, and the mixture was pulverized in a ball mill. The resulting slurry was subjected to classification and hydraulic elutriation by using a liquid cyclone to remove impurities and subjected to evaporation to adjust the water content to 50%. In a ball mill having a capacity of 7.5 liters, 325 g of concentrated sulfuric acid was added to the clay slurry to form a creamy mixture. The mixture was heated at 180° C. in a steam atmosphere for 3 hours to effect the acid treatment. Sulfates formed by the reaction were washed away and removed, and the residue was washed with water until no sulfate ion was detected, to obtain an acid-treated clay.

Results of the chemical analysis and X-ray diffractions analysis of the starting clay and acid-treated clay are shown in Table 17.

Table 17

| | Sample 6-1 | | Sample 6-2 | | Sample 6-3 | |
|---|---|---|---|---|---|---|
| | Sub-bentonite produced in Tsugawa, Niigata Prefecture, Japan | | White clay produced in Sanko, Niigata Perfecture, Japan | | Sub-bentonite produced in Chito, USA | |
| Clay | Untreated | Acid-Treated | Untreated | Acid-Treated | Untreated | Acid-Treated |
| Composition (% by weight) | | | | | | |
| ignition loss | 3.65 | 4.3 | 11.85 | 8.5 | 7.14 | 6.91 |
| $SiO_2$ | 73.96 | 88.31 | 53.11 | 83.49 | 60.37 | 86.01 |
| $Al_2O_3$ | 15.22 | 4.31 | 30.17 | 6.21 | 24.83 | 4.10 |
| $Fe_2O_3$ | 2.72 | 1.30 | 3.95 | 1.10 | 2.74 | 1.08 |
| CaO | 1.12 | 0.68 | 0.52 | 0.22 | 1.66 | 0.80 |
| MgO | 2.42 | 1.1 | 1.31 | 0.48 | 3.22 | 1.10 |
| $SiO_2/Al_2O_3$ Molar Ratio | 8.26 | 34.9 | 3.0 | 22.9 | 4.13 | 35.7 |
| AAI | 2 | 24 | 7 | 33 | 1.5 | 40 |
| [001] DC (%) | 100 | undetectable | 100 | undetectable | 100 | undetectable |
| [020] DC (%) | 100 | 15 | 100 | 7 | 100 | 15 |

Water was added to each acid-treated product so that the solid concentration was 20% by weight, and the mixture was wet-pulverized in a ball mill to obtain a fine slurry. Each slurry was charged in a glass beaker having a capacity of 1 liter. Then, 9.7 g, 9.2 g and 9.5 g of sodium hydroxide were added to slurries of acid-treated products of samples 6-1, 6-2 and 6-3, respectively, under agitation, and each mixture was aged at 60° C. for 2 hours to obtain an alkali metal polysilicate slurry.

Then, alkali metal aluminosilicate slurries were prepared from the above slurries in the same manner as described in Example 1 while adjusting amounts added of sodium aluminate and NaOH based on the analysis values of the acid-treated products so as to attain the following composition:

$Na_2O/SiO_2$ molar ratio = 1.26
$SiO_2/Al_2O_3$ molar ratio = 2.0
$H_2O/Na_2O$ molar ratio = 50

Then, in the same manner as described in Example 1, the crystallization reaction was carried out, and the reaction product was recovered through washing and drying. Properties of the so obtained zeolites were determined in the same manner as described in Example 1 to obtain results shown in Table 18. Samples 6-4, 6-5 and 6-6 Table 18 are those obtained from acid-treated clay samples 6-1, 6-2 and 6-3, respectively.

Table 18

| Item | Sample 6-4 | Sample 6-5 | Sample 6-6 |
|---|---|---|---|
| Crystal Form | A | A | A |
| Crystallization Degree (CR) | 70 | 71 | 69 |
| Calcium Ion Binding Property (CI) | 135 | 138 | 132 |
| Initial Buffer Capacity (R) | 38 | 36 | 39 |
| Buffer Capacity (S) | 165 | 156 | 168 |
| Effective Alkali Quantity (Qc) | 3.5 | 3.8 | 3.9 |
| Suspension pH | 10.7 | 10.6 | 10.8 |
| Oil Absorption (OA) | 54 | 52 | 56 |
| Bulk Density (BD) | 0.42 | 0.45 | 0.41 |
| Primary Particle size (Dp)($\mu$) | 0.8 | 0.7 | 0.8 |
| Secondary Particle Size Distribution(Ds)(% by weight) | | | |
| 0 – 3 $\mu$ | 91 | 93 | 90 |
| 3 – 4 $\mu$ | 9 | 7 | 10 |
| 4 $\mu$ – | — | — | — |
| Sedimentation Speed (Vs) | 0.7 | 0.8 | 0.6 |
| Methylene Blue Adsorbing Property (AM) | 5 | 5 | 5 |
| Surface Charge Controlling Property (ED) | 5 | 5 | 5 |

Detergents were prepared by using the above zeolites in the same manner as described in Example 1, and properties of the resulting detergents were determined in the same manner as in Example 1 to obtain results shown in Table 19.

Table 19

| | Sample 6-7 | Sample 6-8 | Sample 6-9 |
|---|---|---|---|
| Sample Number of Zeolite Used | 6-4 | 6-5 | 6-6 |
| Washing Power | +1 | +1 | +1 |
| Re-Contamination Preventing Effect | 5 | 5 | 5 |
| Rinsing Property | 4.5 | 4.5 | 4.5 |
| Suspension Stability | 0.4 | 0.4 | 0.4 |
| Powder Falling Property | +1 | +1 | +1 |

As will be apparent from the results shown in Table 19, according to this invention, synthetic zeolites excellent as builders for detergents can be obtained even if the kind of the starting smectite clay or the acid treatment condition is changed.

EXAMPLE 7

Water was added to 500 g of the same acid clay as used in Example 1, that was produced in Nakajo, Niigata Prefecture, Japan, to form 5 Kg of a mixture, and the mixture was sufficiently pulverized in a ball mill and subjected to classification and hydraulic elutriation by using a liquid cyclone. Water was removed from the resulting clay slurry (sample 7-1) by filtration and drying so that the water content was reduced to about 60 %. The slurry was charged in a lead-lined vessel together with sulfuric acid having a concentration of about 40 %, and the mixture was heated at 90° C. under agitation for 20 hours to effect acid treatment, followed by filtration and water washing. Then, 13.4 g of sodium hydroxide was added to 100 g (as the dry product) of the so obtained activated silica (sample 7-2) at 60° C. under agitation and the treatment was conducted for 2 hours to obtain an alkali metal polysilicate slurry (sample 7-3).

Particle size distributions ( Ds ) of the clay slurry ( sample 7-1 ), the activated silica slurry ( sample 7-2 ) and the alkali metal polysilicate slurry ( sample 7-3 ) are shown in Table 20.

Table 20

| Particle Size Distribution (%) | Sample 7-1 | Sample 7-2 | Sample 7-3 |
|---|---|---|---|
| 0 – 5 $\mu$ | 70 | 78 | 84 |
| 5 – 20 $\mu$ | 30 | 22 | 16 |
| above 20 $\mu$ | 0 | 0 | 0 |

A sodium aluminate solution and commercially available sodium hydroxide were added to the alkali metal polysilicate slurry so that the following composition ( molar ratios ) was attained:

$Na_2O/SiO_2 = 1.2$ $SiO_2/Al_2O_3 = 2.0$ $H_2O/Na_2O = 50.0$

CA value $\approx$ 1.95 %

The so obtained alkali metal aluminosilicate gelatinous slurry was heated at 90° C. to effect crystallization reaction, and the reaction product ( sample 7-4 ) was recovered through washing and drying. Properties of the reaction product were determined in the same manner as described in Example 1 to obtain results shown in Table 21.

Table 21

| Item | Sample 7-4 |
|---|---|
| Crystal Form | A |
| Crystallization Degree (CR) | 72 |
| Calcium Ion Binding Property (CI) | 141 |
| Initial Buffer Capacity (R) | 38 |
| Buffer Capacity (S) | 170 |
| Effective Alkali Quanty (Qc) | 3.6 |
| Suspension pH | 10.8 |
| Oil Absorption (OA) | 59 |
| Bulk Density (BD) | 0.38 |
| Primary Particle Size (Dp)($\mu$) | 0.3 |
| Secondary Particle Size Distribution (Ds) (% by weight) | |
| 0 – 3 $\mu$ | 100 |
| 3 – 4 $\mu$ | — |
| 4 $\mu$ – | — |
| Sedimentation Speed (Vs) | 0.5 |
| Methylene Blue Adsorbing Property (AM) S | 5 |
| Surface Charge Controlling Property (ED) | 5 |

A detergent was prepared by using the above zeolite as the builder in the same manner as described in Example 1, and properties of the resulting detergent ( sample 7-5 ) were determined in the same manner as described in Example 1 to obtain results shown in Table 22.

Table 22

| | Sample 7-5 |
|---|---|
| Sample Number of Zeolite Used | 7-4 |
| Washing Power | +2 |
| Re-Contamination Preventing Effect | 5 |
| Rinsing Property | 4.7 |
| Suspension Stability | 0.3 |
| Power Falling Proerty | +2 |

As is seen from the results shown above, according to this invention, even when an alkali metal polysilicate obtained by acid-treating a clay after refining and pulverization and opre-treating the acid-treated clay with the alkali component is used as the starting material, a synthetic zeolite excellent in washing effects as well as synthetic zeolites obtained in the preceding Examples can be prepared.

EXAMPLE 8

This Example illustrates another methods for preparing alkali metal aluminosilicate gels. Run (A) ( method comprising adding a slurry of an alkali metal polysilicate corresponding to $Na_2O.10SiO_2$ to an alkali metal aluminate solution ):

A beaker having a capacity of 2 liters was charged with 1118 g of an alkali metal aluminate solution containing 7.4 % of $Al_2O_3$ and 7.27 % of $Na_2O$. Water was added to the same alkali metal polysilicate slurry as prepared in Example 1 so that the $SiO_2$ concentration was 10 %, and 952 g of the resulting slurry was added to the above alkali metal aluminate solution over a period of about 30 minutes. The mixture was treated in the same manner as in Example 1 to obtain a homogeneous gelatinous slurry of an alkali metal aluminosilicate.

This alkali metal aluminosilicate slurry was reacted at 85° C. for 4 hours to crystallize out a synthetic zeolite. The resulting crystal was recovered by filtration, washed with water and dried to obtain a synthetic zeolite ( sample 8-1 ). Run (B) ( method comprising simultaneously adding an alkali metal aluminate solution and an alkali metal polysilicate to water ):

A beaker having a capacity of 2 liters was charged with 265 g of water, and 892 g of a slurry of an alkali metal polysilicate ( corresponding to $Na_2O.10SiO_2$ ) having an $SiO_2$ concentration of 11.2 % by weight and 913 g of an alkali metal aluminate solution having an $Al_2O_3$ concentration of 9.1 % by weight were simultaneously added to the content of the beaker under agitation over a period of about 30 minutes. At the initial stage of the mixing operation, slight increase of the viscosity was observed, but both the components were well dispersed in the latter stage and a homogeneous gelatinous slurry was obtained.

In the same manner as in Run (A), the slurry was reacted at 85° C. for 4 hours to effect crystallization. The resulting crystal was recovered by filtration, washed with water and dried to obtain a synthetic zeolite ( sample 8-2 ).

Properties of these synthetic zeolites were determined in the same manner as described in Example 1 to obtain results shown in Table 23.

Table 23

| Item | Sample 8-1 | Sample 8-2 |
|---|---|---|
| Crystal Form | A | A |
| Crystallization Degree (CR) | 70 | 70 |
| Calcium Ion Bonding Property (CI) | 38 | 139 |
| Initial Buffer Capacity (R) | 36 | 36 |
| Buffer Capacity (S) | 168 | 168 |
| Effective Alkali Quanity (Qc) | 3.5 | 3.5 |
| Suspension pH | 10.6 | 10.5 |
| Oil Absorption (OA) | 52 | 51 |
| Bulk Density (BD) | 0.42 | 0.42 |
| Primary Particle Size (Dp)($\mu$) | 0.4 | 0.4 |
| Secondary Particle Size Distribution (Ds) (% by weight) | | |
| 0 - 3 $\mu$ | 98.2 | 99 |
| 3 - 4 $\mu$ | 1.8 | 1 |
| 4 $\mu$ - | — | — |
| Sedimentation Speed (Vs) | 0.7 | 0.7 |
| Methylene Blue Adsorbing Property (AM) | 5 | 5 |
| Surface Charge Controlling Property (ED) | 5 | 5 |

Detergents were prepared by using the above synthetic zeolites in the same manner as described in Example 1, and properties of the resulting detergents ( samples 8-3 and 8-4 ) were determined in the same manner as described in Example 1 to obtain results shown in Table 24.

Table 24

| | Sample 8-3 | Sample 8-4 |
|---|---|---|
| Sample Number of Zeolite Used | 8-1 | 8-2 |
| Washing Power | +2 | +2 |
| Re-contamination Preventing Effect | 5 | 5 |
| Rinsing Property | 4.5 | 4.5 |
| Suspension Stability | 0.3 | 0.3 |
| Powder Falling Property | +2 | +2 |

As is apparent from the above results, according to this invention, even when an alkali metal polysilicate is added to an alkali metal aluminate or both the alkali metal salts are simultaneously added to water, synthetic zeolites excellent in washing effects as well as synthetic zeolites obtained in the preceding Examples can be prepared.

EXAMPLE 9

This Example illustrates influences of the alkali concentration of the zeolite-crystallizing-out reaction between sodium aluminate and an alkali metal polysilicate formed by subjecting an acid-treated acid clay to the pre-treatment with an alkali metal component.

Each of 3 beakers having a capacity of 1 liter was charged with 300 g of an alkali metal polysilicate slurry prepared in the same manner as in Example 1, and sodium aluminate comprising 18.54 % of $Na_2O$, 19.1 % of $Al_2O_3$ and 62.36 % of $H_2O$ and commercially available sodium hydroxide were added to the slurry together with water if necessary, so that the alkali concentration, CA value, was 4, 2.5 and 1.2 mole %. The composition was adjusted so that the $Na_2O/SiO_2$ molar ratio was 1.0 and the $SiO_2/Al_2O_3$ molar ratio was 2.0. The resulting alkali metal aluminosilicate gel was reacted at 95° C. for 3 hours under agitation to form crystalline particles of a synthetic zeolite. The mother liquor was removed, and the residue was washed with water and filtered and the filter cake was recovered. Thus, there were obtained 3 synthetic zeolites, namely sample 9-1 ( prepared from the raw material having a CA value of 4 mole %), sample 9-2 ( prepared from the raw material having a CA value of 2.5 mole % ) and sample 9-3 ( prepared from the raw material having a CA value of 1.2 mole % ). Properties of these zeolites were determined in the same manner as described in Example 1 to obtain results shown in Table 25.

Table 25

| Item | Sample 9-1 | Sample 9-2 | Sample 9-3 |
|---|---|---|---|
| Crystal Form | A | A | A |
| Crystallization Degree (CR) | 64.2 | 63.5 | 64.1 |
| Calcium Ion Binding Property (CI) | 132 | 135 | 133 |
| Initial Buffer Capacity (R) | 58.1 | 52.8 | 42.2 |
| Buffer Capcity (S) | 185 | 172 | 148 |
| Effective Alkali Quantity (Qc) | 4.6 | 4.68 | 3.12 |
| Suspension pH | 10.8 | 10.9 | 10.3 |
| Oil Absorption (OA) | 68 | 68.5 | 75.5 |
| Bulk Density (BD) | 0.432 | 0.376 | 0.283 |
| Primary Particle Size (Dp)($\mu$) | 0.2 | 0.4 | 1 |
| Secondary Particle Size Distribution (Ds) (% by weight) | | | |
| 0 - 3 $\mu$ | 100 | 94 | 82 |
| 3 - 4 $\mu$ | — | 6 | 18 |
| 4 $\mu$ - | — | — | — |
| Sedimentation Speed (Vs) | 0.5 | 0.6 | 0.8 |
| Methylene Blue Adsorbing Property (AM) | 5 | 5 | 5 |
| Surface Charge Controlling Property (ED) | 5 | 5 | 5 |

Detergents were prepared from the above zeolites in the same manner as described in Example 1, and properties of the resulting detergents were determined in the same manner as described in Example 1 to obtain results shown in Table 26.

Table 26

|  | Sample 9-4 | Sample 9-5 | Sample 9-6 |
|---|---|---|---|
| Sample Number of Zeolite Used | 9-1 | 9-2 | 9-3 |
| Washing Power | +2 | +1 | +0 |
| Re-Contamination Preventing Effect | 5 | 5 | 5 |
| Rinsing Property | 4.6 | 4.6 | 4.5 |
| Suspension Stability | 0.3 | 0.8 | 1.2 |
| Powder Falling Property | +2 | +1 | —0 |

EXAMPLE 10

In this Example, a synthetic zeolite prepared from an alkali metal aluminosilicate slurry was separated from the mother liquor in such a state that a part of excessive sodium hydroxide contained in the mother liquor was incorporated in the zeolite and an acid or acidic salt was added to the so separated zeolite composition to effect neutralization and obtain a synthetic zeolite builder composition.

As the alkali metal aluminosilicate builder containing the alkali metal component, there were chosen the zeolite crystal-containing slurry prepared in Example 1 from which the mother liquor had not been separated by filtration (base S), the filter cake formed by removing the mother liquor from base S by filtration so that the solid content was 50% (base C) and the filter cake formed by washing base C with water one time (base F). Then, an acid or acidic salt shown in Table 27 was added to such alkali metal component-containing zeolite composition (base S, C or F) in an amount indicated in Table 27 (parts by weight per 100 parts by weight of the base as the dried product, and the mixture was sufficiently agitated and blended and dried at about 170° C. by using a hot air drier to form an alkali metal aluminosilicate builder in which a part of the contained alkali metal hydroxide component was neutralized and combined with the alkali metal component contained. Thus, there were prepared 34 kinds of such alkali metal silicate binders (samples 10-1 to 10-34) as shown in Table 27.

For comparison, an acid (sulfuric acid) was added for neutralization so that the pH was reduced below 9.0, and the mixture was treated in the same manner as described above to form comparative sample H-12.

Comparative samples were prepared directly from bases S and C in which an acid or acidic salt was not incorporated. More specifically, a powdery sample H-10 was prepared by concentrating entirely base S according to a customary method for concentrating and solidifying slurries, drying the concentrate at about 170° C. and pulverizing the resulting solid, and a powdery sample H-11 was prepared by drying base C at about 170° C. and pulverizing the dried product.

Properties of the foregoing samples were determined in the same manner as described in Example 1 to obtain results shown in Table 27.

Table 27

| Sample No. |  | Crystal Form | Crystallization Degree | Calcium Ion Binding Property(CI) | Initial Buffer Capacity (R) |
|---|---|---|---|---|---|
| 10-1 | base S + H$_2$SO$_4$(3 parts) | 4A | 69.1 | 130 | 40.8 |
| 10-2 | base S + H$_3$BO$_3$(6 parts) | 4A | 69.2 | 135 | 105.6 |
| 10-3 | base S + citric acid(3 parts) | 4A | 68.3 | 135 | 81.8 |
| 10-4 | base S + citric acid(6 parts) | 4A | 66.3 | 135 | 105.6 |
| 10-5 | base S + citric acid(10 parts) | 4A | 65.2 | 135 | 89.7 |
| 10-6 | base S + H$_3$PO$_4$(3 parts) | 4A | 68.4 | 135 | 84.4 |
| 10-7 | base S + H$_3$PO$_4$(6 parts) | 4A | 65.0 | 135 | 102.9 |
| 10-8 | base S + H$_3$PO$_4$(10 parts) | 4A | 64.2 | 135 | 110.8 |
| 10-9 | base S + polysilicic acid(3 parts) | 4A | 66.1 | 130 | 41.2 |
| H-10 | base S | sodalite 4A | 68.2 | 40 | 79.8 |
| 10-10 | base C + citric acid(3 parts) | 4A | 68.8 | 135 | 68.6 |
| 10-11 | base C + citric acid(6 parts) | 4A | 66.7 | 135 | 63.3 |
| 10-12 | base C + citric acid(10 parts) | 4A | 65.4 | 135 | 39.6 |
| 10-13 | base C + H$_3$PO$_4$(3 parts) | 4A | 66.2 | 135 | 71.3 |
| 10-14 | base C + H$_3$PO$_4$(6 parts) | 4A | 67.1 | 135 | 66.0 |
| 10-15 | base C + polysilicic acid(3 parts) | 4A | 68.3 | 130 | 40.0 |
| H-11 | base C | sodalite 4A | 68.6 | 35 | 67.1 |
| 10-16 | base F + citric acid(1 part) | 4A | 69.3 | 140 | 50.1 |
| 10-17 | base F + citric acid(3 parts) | 4A | 68.5 | 140 | 58.1 |

| Sample No. | Buffer Capacity (S) | Effective Alkali Quantity(Qc) | Suspension pH | Oil Absorption (OA) | Bulk Density (BD) | Primary Particle Size(Dp)(μ) |
|---|---|---|---|---|---|---|
| 10-1 | 160.2 | 10.4 | 11.7 | 51 | 0.5 | 0.4 |
| 10-2 | 348.3 | 13.2 | 11.6 | 48 | 0.49 | 0.4 |
| 10-3 | 237.5 | 15.9 | 12.4 | 50 | 0.49 | 0.4 |
| 10-4 | 348.3 | 11.4 | 11.3 | 48 | 0.49 | 0.4 |
| 10-5 | 285.0 | 12.2 | 12.1 | 47 | 0.49 | 0.4 |
| 10-6 | 366.8 | 12.4 | 11.5 | 53 | 0.48 | 0.4 |
| 10-7 | 345.0 | 12.2 | 11.9 | 49 | 0.49 | 0.4 |
| 10-8 | 435.7 | 9.7 | 11.0 | 48 | 0.49 | 0.4 |
| 10-9 | 140.1 | 5.8 | 10.0 | 52 | 0.48 | 0.4 |
| H-10 | 200 | 16.8 | 12.6 | 43 | 0.51 | 0.4 |
| 10-10 | 192.6 | 6.5 | 11.8 | 54 | 0.49 | 0.4 |
| 10-11 | 229.6 | 5.3 | 11.0 | 51 | 0.49 | 0.4 |
| 10-12 | 234.9 | 3.7 | 9.0 | 48 | 0.49 | 0.4 |
| 10-13 | 237.5 | 5.2 | 10.6 | 55 | 0.48 | 0.4 |
| 10-14 | 306.1 | 4.8 | 9.0 | 51 | 0.48 | 0.4 |
| 10-15 | 139.3 | 4.1 | 10.0 | 54 | 0.47 | 0.4 |
| H-11 | 184.9 | 7.3 | 12.1 | 40 | 0.51 | 0.4 |
| 10-16 | 168.9 | 3.19 | 10.6 | 58 | 0.47 | 0.4 |
| 10-17 | 168.9 | 2.81 | 9.2 | 56 | 0.47 | 0.4 |

Secondary Particle Size Dis-    Sedimenta-    Methylene Blue    Surface Charge

Table 27-continued

| Sample No. | tribution (Ds) (% by weight) 0-3μ | 3-4μ | 4μ- | tion Speed (Vs) | Absorbing Property (AM) | Controlling Property (ED) |
|---|---|---|---|---|---|---|
| 10-1 | 91 | 9 | 0 | 0.6 | 5 | 4 |
| 10-2 | 93 | 7 | 0 | 0.6 | 5 | 4 |
| 10-3 | 93 | 7 | 0 | 0.4 | 5 | 4 |
| 10-4 | 95 | 5 | 0 | 0.4 | 5 | 4 |
| 10-5 | 97 | 3 | 0 | 0.4 | 5 | 4 |
| 10-6 | 100 | — | — | 0.5 | 5 | 4 |
| 10-7 | 100 | — | — | 0.5 | 5 | 4 |
| 10-8 | 100 | — | — | 0.6 | 5 | 4 |
| 10-9 | 92 | 8 | — | 0.4 | 5 | 4 |
| H-10 | 90 | 8 | 2 | 0.6 | 2 | 4 |
| 10-10 | 90 | 10 | — | 0.4 | 5 | 4 |
| 10-11 | 89 | 11 | — | 0.4 | 5 | 4 |
| 10-12 | 89 | 11 | — | 0.5 | 5 | 4 |
| 10-13 | 98 | 2 | — | 0.5 | 5 | 4 |
| 10-14 | 100 | — | — | 0.5 | 5 | 4 |
| 10-15 | 93 | 7 | — | 0.4 | 5 | 4 |
| H-11 | 91 | 8 | 1 | 0.6 | 1.5 | 4 |
| 10-16 | 92 | 8 | 0 | 0.4 | 5 | 4 |
| 10-17 | 93 | 7 | 0 | 0.4 | 5 | 4 |

| Sample No. | | Crystal Form | Crystallization Degree | Calcium Ion Binding Property(CI) | Initial Buffer Capacity (R) |
|---|---|---|---|---|---|
| 10-18 | base F + citric acid (5 parts) | 4A | 68.5 | 140 | 71.3 |
| 10-19 | base F + citric acid (7 parts) | 4A | 68.1 | 140 | 63.3 |
| 10-20 | base F + $H_3PO_4$ (1 part) | 4A | 70.2 | 140 | 50.1 |
| 10-21 | base F + $H_3PO_4$ (5 parts) | 4A | 68.3 | 140 | 42.2 |
| H-12 | base F + $H_2SO_4$ (1 part) | 4A | 69.1 | 126 | 36.9 |
| 10-22 | base F + $H_3PO_4$(1 part) + NaOH | 4A | 69.1 | 140 | 47.5 |
| 10-23 | base F + $H_3PO_4$(3 parts) + NaOH | 4A | 68.8 | 140 | 47.5 |
| 10-24 | base F + $H_3PO_4$(5 parts) + NaOH | 4A | 69.1 | 140 | 47.5 |
| 10-25 | base F + $H_3PO_4$(10 parts) + NaOH | 4A | 67.0 | 140 | 47.5 |
| 10-26 | base F + $Na_2HPO_4$ (1 part) | 4A | 68.2 | 137 | 39.6 |
| 10-27 | base F + $Na_2HPO_4$ (3 parts) | 4A | 68.0 | 140 | 39.6 |
| 10-28 | base F + $Na_2HPO_4$ (4.8 parts) | 4A | 67.1 | 140 | 44.9 |
| 10-29 | base F + $NaH_2PO_4$ (1 part) | 4A | 69.1 | 139 | 42.2 |
| 10-30 | base F + $NaH_2PO_4$ (3 parts) | 4A | 68.5 | 140 | 45.5 |
| 10-31 | base F + $NaH_2PO_4$ (4.8 parts) | 4A | 67.0 | 138 | 45.5 |
| 10-32 | base F + $H_3PO_3$(5 parts) + NaOH | 4A | 67.1 | 139 | 63.3 |
| 10-33 | base F + $H_3BO_3$(10 parts) + NaOH | 4A | 67.1 | 140 | 71.3 |
| 10-34 | base F + polysilicic acid (13 parts) | 4A | 68.0 | 140 | 42.0 |

| Sample No. | Buffer Capacity (S) | Effective Alkali Quantity (Qc) | Suspension pH | Oil Absorption (OA) | Bulk Density (BD) | Primary Particle Size(Dp)(μ) |
|---|---|---|---|---|---|---|
| 10-18 | 168.9 | 2.73 | 9.15 | 54 | 0.48 | 0.4 |
| 10-19 | 168.9 | 2.64 | 9.05 | 54 | 0.48 | 0.4 |
| 10-20 | 163.6 | 2.57 | 9.3 | 58 | 0.48 | 0.4 |
| 10-21 | 147.8 | 2.32 | 9.1 | 52 | 0.48 | 0.4 |
| H-12 | 126.7 | 1.99 | 8.8 | 44 | 0.47 | 0.4 |
| 10-22 | 155.7 | 3.64 | 11.1 | 52 | 0.48 | 0.4 |
| 10-23 | 153.1 | 3.55 | 11.1 | 50 | 0.47 | 0.4 |
| 10-24 | 153.1 | 3.39 | 11.1 | 48 | 0.47 | 0.4 |
| 10-25 | 153.1 | 3.43 | 11.1 | 48 | 0.47 | 0.4 |
| 10-26 | 166.3 | 3.80 | 11.0 | 58 | 0.48 | 0.4 |
| 10-27 | 184.7 | 3.93 | 10.9 | 57 | 0.48 | 0.4 |
| 10-28 | 195.3 | 4.05 | 10.8 | 54 | 0.48 | 0.4 |
| 10-29 | 158.3 | 3.55 | 10.6 | 57 | 0.48 | 0.4 |
| 10-30 | 168.9 | 3.31 | 9.9 | 55 | 0.48 | 0.4 |
| 10-31 | 190.0 | 3.06 | 9.0 | 55 | 0.48 | 0.4 |
| 10-32 | 166.3 | 4.79 | 11.1 | 55 | 0.48 | 0.4 |
| 10-33 | 168.9 | 5.21 | 11.1 | 52 | 0.48 | 0.4 |
| 10-34 | 142.0 | 3.2 | 10.1 | 53 | 0.47 | 0.4 |

| Sample No. | Secondary Particle Size Distribution (Ds) (% by weight) 0-3μ | 3-4μ | 4μ- | Sedimentation Speed (Vs) | Methylene Blue Absorbing Property (AM) | Surface Charge Controlling Property (ED) |
|---|---|---|---|---|---|---|
| 10-18 | 90 | 10 | 0 | 0.4 | 5 | 4 |
| 10-19 | 93 | 7 | 0 | 0.5 | 5 | 4 |
| 10-20 | 99 | 1 | 0 | 0.5 | 5 | 4 |
| 10-21 | 100 | — | — | 0.6 | 5 | 4 |
| H-12 | 100 | — | — | 0.6 | 5 | 4 |
| 10-22 | 100 | — | — | 0.4 | 5 | 4 |
| 10-23 | 99 | 1 | — | 0.5 | 5 | 4 |
| 10-24 | 98 | 2 | — | 0.5 | 5 | 4 |
| 10-25 | 100 | — | — | 0.6 | 5 | 4 |
| 10-26 | 100 | — | — | 0.6 | 5 | 4 |
| 10-27 | 100 | — | — | 0.6 | 5 | 4 |
| 10-28 | 99 | 1 | — | 0.6 | 5 | 4 |
| 10-29 | 99 | 1 | — | 0.6 | 5 | 4 |
| 10-30 | 100 | — | — | 0.6 | 5 | 4 |
| 10-31 | 100 | — | — | 0.6 | 5 | 4 |
| 10-32 | 98 | 2 | — | 0.6 | 5 | 4 |
| 10-33 | 98 | 2 | — | 0.6 | 5 | 4 |
| 10-34 | 95 | 5 | — | 0.6 | 5 | 4 |

By using the above alkali metal aluminosilicate builder samples 10-3, 10-6, 10-10, 10-13, 10-16, 10-20, 10-26 and 10-32, detergents (samples 10-35 to 10-42)

were prepared in the same manner as described in Example 1.

Properties of the so prepared detergents were determined in the same manner as described in Example 1 to obtain results shown in Table 28.

Detergents were prepared in the same manner as described in Example 1 by using the above samples 11-1 and 11-2, and properties of the resulting detergents (samples 11-3 and 11-4) were determined in the same manner as described in Example 1 to obtain results shown in Table 30.

Table 28

| | Sample 10-35 | Sample 10-36 | Sample 10-37 | Sample 10-38 | Sample 10-39 | Sample -40 | Sample 10-41 | Sample 10-42 |
|---|---|---|---|---|---|---|---|---|
| Sample Number of Zeolite Used | 10-3 | 10-6 | 10-10 | 10-13 | 10-16 | 10-20 | 10-26 | 10-32 |
| Washing Power | +2 | +2 | +2 | +2 | +2 | +2 | +2 | +2 |
| Re-Contamination Preventing Effect | 5 | 5 | 5 | 5 | 5 | 5 | 5 | 5 |
| Rinsing Property | 4.3 | 4.2 | 4.3 | 4.4 | 4.4 | 4.5 | 4.4 | 4.4 |
| Suspension Stability | 0.4 | 0.4 | 0.3 | 0.3 | 0.3 | 0.3 | 0.3 | 0.3 |
| Powder Falling Property | +2 | +2 | +2 | +2 | +2 | +2 | +2 | +2 |

EXAMPLE 11

This Example illustrates a builder composition prepared by separating a synthetic zeolite crystallized out at the step of preparing an alkali metal aluminosilicate builder from the mother liquor in a state where a part of excessive sodium hydroxide contained in the mother liquor is included into the zeolite, adding phosphoric acid ($H_3PO_4$) to the recovered zeolite composition and drying and calcining the resulting mixture, and a builder composition prepared by washing the above zeolite separated from the mother liquor with water, adding disodium hydrogenphosphate ($Na_2HPO_4$) to the washed zeolite and drying and calcining the resulting mixture.

Run (A)

A 5% solution of commerically available phosphoric acid was added to base C described in Example 10 so that the pH was reduced to 10, and the resulting slurry composition was dried in a drier maintained at 110° C, calcined at 500° C. for 1 hour in an electric furnace and pulverized to obtain a powdery sample (sample 11-1).

Run (B)

To 100 g of base F described in Example 10 was added a 10% solution of disodium hydrogen phosphate in an amount, as $Na_2HPO_4$, corresponding to 10% by weight based on the zeolite, and the mixture was dried in a drier maintained at 110° C., calcined at 500° C. for 1 hour in an electric furnace and pulverized to obtain a powdery sample (sample 11-2).

Properties of the so prepared samples were determined in the same manner as described in Example 1 to obtain results shown in Table 29.

Table 29

| Item | Sample 11-1 | Sample 11-2 |
|---|---|---|
| Crystal Form | A+sodium phosphate | A+sodium phosphate |
| Crystallization Degree (CR) | 67 | 70 |
| Calcium Ion Binding Property (CI) | 170 | 183 |
| Initial Buffer Capacity (R) | 76 | 57 |
| Buffer Capacity (S) | 192 | 200 |
| Effective Alkali Quantity (Qc) | 3.9 | 5.2 |
| Suspension pH | 10.1 | 10.6 |
| Oil Absorption (OA) | 45 | 45 |
| Bulk Density (BD) | 0.45 | 0.45 |
| Primary Particle Size (Dp) ($\mu$) | 0.4 | 0.4 |
| Secondary Particle Size Distribution (Ds) (% by weight) | | |
| 0 - 3 $\mu$ | 97 | 96.2 |
| 3 - 4 $\mu$ | 3 | 3.8 |
| 4 $\mu$ - | 0 | 0 |
| Sedimentation Speed (Vs) | 0.3 | 0.3 |
| Surface Charge Controlling Property (ED) | 4 | 4 |

Table 30

| | Sample 11-3 | Sample 11-4 |
|---|---|---|
| Sample Number of Zeolite Used | 11-1 | 11-2 |
| Washing Power | +2 | +2 |
| Re-Contamination Preventing Effect | 5 | 5 |
| Rinsing Power | 4.6 | 4.6 |
| Suspension Stability | 0.3 | 0.3 |
| Powder Falling Property | +2 | +2 |

EXAMPLE 12

In this Example, zeolite builders prepared according to this invention were incorporated in detergents having a practical composition, and the resulting detergents were subjected to tests using contaminated cloths for determination of the washing power, recontamination preventing effect, rinsing property, suspension stability and powder falling property. Practical detergent compositions adopted in this Example are illustrted in Tables 31 to 33.

Table 31

| Composition A | |
|---|---|
| Components | Parts by Weight |
| Anionic Surface Active Agents | |
|   LAS (linear alkyl benzene-sulfonate) | 10 |
|   AOS ($\alpha$-olefin sulfonate) | 8 |
| Non-Ionic Surface Active Agent | |
|   Polyethylene glycol fatty acid ester | 1 |
| Builder* | 20 |
| Sodium Silicate | 5 |
| Sodium Carbonate | 3 |
| CMC (carboxymethylcellulose) | 1 |
| Sodium Sulfate | 50 |
| Water | 10 |

Table 32

| Composition B | |
|---|---|
| Components | Parts by Weight |
| Anionic Surface Active Agents | |
|   LAS (linear alkyl benzene-sulfonate) | 10 |
|   AS (alcohol sulfate) | 5 |
|   AES (alcohol ether sulfate) | 3 |
| Non-Ionic Surface Active Agent | |
|   Alcohol polyoxyethylene ether | 2 |
| Builder* | 20 |
| Sodium Silicate | 5 |
| Sodium Carbonate | 3 |
| CMC (carboxymethylcellulose) | 1 |
| Sodium Sulfate | 50 |
| Water | 10 |

Table 33

Composition C

| Components | Parts by Weight |
|---|---|
| Anionic Surface Active Agent | |
| LAS (linear alkyl benzene-sulfonate) | 2 |
| Non-Ionic Surface Active Agent | |
| Alkylphenyl polyoxyethylene ether | 18 |
| Builder* | 20 |
| Sodium Silicate | 5 |
| Sodium Carbonate | 5 |
| CMC (carboxymethylcellulose) | 1 |
| Sodium Sulfate | 30 |
| Sodium Perborate | 10 |
| Water | 10 |

As the builder asterisked, there were used those shown in the foregoing Examples and commercially available sodium tripolyphosphate ($Na_5P_3O_{10}$) as a control.

Obtained results are shown in Tables 34, 35 and 36.

Table 34

| | Composition A | | | | |
|---|---|---|---|---|---|
| Sample Number of Builder Used | Washing Power | Re-Contamination Preventing Effect | Rinsing Property | Suspension Stability | Powder Falling Property |
| 1 – 3 | +2 | 5 | 4.6 | 0.3 | +2 |
| 2 – 7 | +2 | 5 | 4.6 | 0.2 | +1 |
| 3 – 1 | +2 | 5 | 4.6 | 0.4 | +2 |
| 4 – 5 | +2 | 5 | 4.6 | 0.3 | +2 |
| 8 – 1 | +2 | 5 | 4.5 | 0.3 | +2 |
| H – 3 | –2 | 2 | 1.2 | 18 | –2 |
| H – 7 | –2 | 1 | 1.0 | 37.4 | –2 |
| Sodium tripolyphosphate | 0 | 5 | 4.6 | — | +2 |

Table 35

| | Composition B | | | | |
|---|---|---|---|---|---|
| Sample Number of Builder Used | Washing Power | Re-Contamination Preventing Effect | Rinsing Property | Suspension Stability | Powder Falling Property |
| 1 – 3 | +2 | 5 | 4.6 | 0.3 | +2 |
| 5 – 7 | +2 | 5 | 4.5 | 0.3 | +2 |
| 6 – 4 | +1 | 5 | 4.4 | 0.4 | +1 |
| 7 – 4 | +2 | 5 | 4.7 | 0.3 | +2 |
| 8 – 1 | +2 | 5 | 4.5 | 0.3 | +2 |
| H – 6 | –2 | 3 | 1.2 | 16 | –2 |
| H – 7 | –2 | 1 | 1 | 37 | –2 |
| Sodium tripolyphosphate | 0 | 5 | 4.6 | | +2 |

Table 36

| | Composition C | | | | |
|---|---|---|---|---|---|
| Sample Number of Builder Used | Washing Power | Re-Contamination Preventing Effect | Rinsing Property | Suspension Stability | Powder Falling Property |
| 2 – 7 | +2 | 5 | 4.6 | 0.2 | +1 |
| 3 – 1 | +2 | 5 | 4.6 | 0.4 | +2 |
| 5 – 7 | +2 | 5 | 4.5 | 0.3 | +2 |
| 6 – 4 | +1 | 5 | 4.4 | 0.4 | +1 |
| 7 – 4 | +2 | 5 | 4.7 | 0.3 | +2 |
| H – 2 | –2 | 3 | 1.4 | 14 | –2 |
| H – 6 | –2 | 3 | 1.2 | 15 | –2 |
| Sodium tripolyphosphate | 0 | 5 | 4.6 | | +2 |

Table 37

Liquid Detergent Composition

| Components | Parts by Weight |
|---|---|
| Anionic Surface Active Agent | |
| LAS (linear alkyl benzene-sulfonate) | 20 |
| Non-Ionic Surface Active Agent | |
| Alcohol polyoxyethylene ether | 1 |
| Ethanol | 7 |
| CMC (carboxymethylcellulose) | 1 |
| Water | 70 |
| Builder* | 20 |

Table 38

| Sample Number of Builder Used | Suspension Stability |
|---|---|
| 1 – 3 | 0.2 |
| 2 – 7 | 0.3 |
| 3 – 1 | 0.2 |
| 8 – 1 | 0.1 |
| H – 3 | 15 |

EXAMPLE 13

In This Example, builders prepared in the foregoing Examples were incorporated in a liquid detergent having a practical composition, and the suspension stability of the resulting detergents was tested. The composition of the liquid detergent is shown in Table 37 and test results are shown in Table 38

From the results shown in Table 38, fine synthetic zeolite builders prepared according to this invention provide detergents excellent in the suspension stability, and the builders of this invention are very valuable.

EXAMPLE 14

In this Example, a synthetic zeolite builder (sample 1-3) was incorporated into a commercially available solid cosmetic soap composition as indicated in Table 39, and properties of the resulting soap were compared with those of a commercially available cosmetic soap by a panel of 5 experts to obtain results shown in Table 40.

Table 39

| Component | Parts by Weight |
|---|---|
| Commercially available solid cosmetic soap | 70 |
| Builder of this invention (sample 1-3) | 30 |
| Water | 20 |

Table 40

| | Evaluation by Panel of 5 Experts |
|---|---|
| Touch to skin | comparable to commercially available soap |
| Touch to hand | " |
| Washing power | superior to commercially available soap |
| Bubbline property | " |
| Generic evaluation | " |

As will readily be understood from the above results, a soap comprising the builder of this invention is comparable or superior to a commercially available cosmetic soap with respect to properties required of cosmetic soaps.

What we claim is:

1. A process for the preparation of detergent builders which comprises acid-treating a smectite clay mineral under such conditions that at least the X-ray diffraction peak of the plane index (001) substantially disappears and removing a basic metal component in the reaction product by extraction to thereby prepare activated silica or activated alumina-silica, treating the so prepared activated silica or activated alumina-silica with an alkali metal hydroxide or a water-soluble alkali metal silicate to prepare an alkali metal polysilicate or alkali metal polyaluminosilicate having a composition in which the $Na_2O/SiO_2$ molar ratio is in the range of from 1/3.5 to 1/500, mixing said alkali metal polysilicate or alkali metal polyaluminosilicate with additional amounts of alumina and alkali metal components and water to prepare a homogeneous mixture having a composition capable of forming zeolite of the type A, and heating said homogeneous mixture to crystallize out fine zeolitic particles having a maximum primary particle size smaller than 1 $\mu$.

2. A process for the preparation of detergent builders according to claim 1 wherein the smectite clay mineral is a montmorillonite clay mineral.

3. A process for the preparation of detergent builders according to claim 1 wherein the smectite clay mineral is acid-treated so that the height of the X-ray diffraction peak of the plane index [001] of the acid-treated clay is less than 1%, of the height of the X-ray diffraction peak of the plane index [001] of the starting smectite clay mineral.

4. A process for the preparation of detergent builders according to claim 1 wherein the smectite clay mineral is acid-treated so that the height of the X-ray diffraction peak of the plane index [001] [020] of the acid-treated clay is less than 15% of the height of the X-ray diffraction peak of the plane index [110] [020] of the starting smectite clay mineral.

5. A process for the preparation of detergent builders according to claim 1 wherein the smectite clay mineral is acid-treated so that the acid-treated clay has an aromatic adsorption index (AAI) of at least 16.

6. A process for the preparation of detergent builders according to claim 1 wherein said activated silica or activated alumina-silica is treated with an alkali metal hydroxide or a water-soluble alkali metal silicate to form an alkali metal polysilicate or alkali metal polyaluminosilicate having a composition in which the $Na_2O/SiO_2$ molar ratio is in the range of from 1/4 to 1/400.

7. A process for the preparation of detergent builders according to claim 1 wherein said activated silica or activated alumina-silica is treated with an alkali metal hydroxide or a water-soluble alkali metal silicate in the presence of water in an amount of 1 to 49 parts by weight of water per part by weight of said activated silica or activated alumina-silica.

8. A process for the preparation of detergent builders according to claim 1 wherein an aqueous mixture of said activated silica or activated alumina-silica and said alkali metal hydroxide or water-soluble alkali metal silicate is aged for at least 0.2 hour.

9. A process for the preparation of detergent builders according to claim 1 wherein the particle size of said alkali metal polysilicate or alkali metal polyaluminosilicate is adjusted so that particles having a size smaller than 5 $\mu$ occupy at least 20% by weight of the total particles and particles having a particle size larger than 20 $\mu$ occupy less than 30% by weight of the total particles.

10. A process for the preparation of detergent builders according to claim 9 wherein said particle size adjustment is carried out in at least one stage of said process prior to heating said homogeneous mixture.

11. A process for the preparation of detergent builders according to claim 1 wherein said alkali metal polysilicate or alkali metal aluminosilicate is mixed with additional amounts of alumina and alkali metal components and water to form a homogeneous admixture having a composition in which the $SiO_2/Al_2O_3$ molar ratio based on the oxides is in the range of from 0.1 to 3.5, the $Na_2O/SiO_2$ molar ratio based on the oxides is in the range of from 0.5 to 5 and the $H_2O/Na_2O$ molar ratio based on the oxides is in the range of from 15 to 150.

12. A process for the preparation of detergent builders according to claim 11 wherein said homogeneous admixture is formed by adding an alkaline aqueous solution of an alkali metal aluminate to an aqueous dispersion of said alkali metal polysilicate or alkali metal polyaluminosilicate.

13. A process for the preparation of detergent builders according to claim 1 wherein the alkali concentration (as expressed as mole % of $Na_2O$) in the homogeneous admixture is in the range of 0.25 to 7 mole %.

14. A process for the preparation of detergent builders according to claim 1 wherein zeolite is crystallized out by heating said homogeneous admixture under conditions satisfying the following requirements:

$$24 \geq t \cdot \exp [1.3 \times 10^4(\frac{1}{363} - \frac{1}{T})] \geq 0.5$$
$$6 - 0.12t \cdot \exp [1.3 \times 10^4(\frac{1}{363} - \frac{1}{T})] \geq CA$$

wherein $t$ stands for the crystallizing-out time (hr), $T$ stands for the crystallizing-out temperature (° K, absolute temperature), and $CA$ stands for an alkali concentration (mole %) in the zeolite-forming homogeneous admixture.

15. A process for the preparation of detergent builders according to claim 3 wherein the smectite clay mineral is acid-treated so that the height of the X-ray diffraction peak of the plane index [001] of the acid-treated clay is less than 5% of the height of the X-ray diffraction peak of the plane index (001) of the starting smectite clay mineral.

16. A process for the preparation of detergent builders according to claim 4 wherein the smectite clay mineral is acid-treated so that the height of the X-ray diffraction peak of the plane index [001][020] of the acid-treated clay is less than 5% of the height of the X-ray diffraction peak of the plane index [110][020] of the starting smectite clay mineral.

17. A process for the preparation of detergent builders according to claim 5 wherein the smectite clay mineral is acid-treated so that the acid-treated clay has an aromatic adsorption index (AAI) of at least 20 to 60.

18. A process for the preparation of detergent builders according to claim 6 wherein said activated silica or activated alumina-silica is treated with an alkali metal hydroxide or a water-soluble alkali metal silicate to form an alkali metal polysilicate or alkali metal polyaluminosilicate having a composition in which the $Na_2O/SiO_2$ molar ratio is in the range of from 1/7 to 1/300.

19. A process for the preparation of detergent builders according to claim 7 wherein said activated silica or activated alumina-silica is treated with an alkali metal hydroxide or a water-soluble alkali metal silicate in the presence of water in an amount of 2 to 9 parts by weight of water per part by weight of said activated silica or activated alumina-silica.

20. A process for the preparation of detergent builders according to claim 8 wherein an aqueous mixture of said activated silica or activated alumina-silica and said alkali metal hydroxide or water-soluble alkali metal silicate is aged for at least 2 hours.

21. A process for the preparation of detergent builders according to claim 9 wherein the particle size of said alkali metal polysilicate or alkali metal polyaluminosilicate is adjusted so that particles having a size smaller than 5 $\mu$ occupy at least 50% by weight of the total particles and particles having a particle size larger than 20 $\mu$ occupy less than 10% by weight of the total particles.

22. A process for the preparation of detergent builders according to claim 10 wherein said particle size adjustment is carried out before the alkali treatment.

* * * * *